United States Patent [19]
Lipo et al.

[11] Patent Number: 6,031,738
[45] Date of Patent: Feb. 29, 2000

[54] DC BUS VOLTAGE BALANCING AND CONTROL IN MULTILEVEL INVERTERS

[75] Inventors: Thomas A. Lipo, Middleton, Wis.; Gautam Sinha, Albany, N.Y.

[73] Assignee: Wisconsin Alumni Research Foundation, Madison, Wis.

[21] Appl. No.: 09/098,118

[22] Filed: Jun. 16, 1998

[51] Int. Cl.$^7$ .................................................. H02M 5/45
[52] U.S. Cl. ................................. 363/37; 363/43; 363/98
[58] Field of Search ................................. 363/34, 37, 43, 363/95, 98, 132

[56] References Cited

U.S. PATENT DOCUMENTS

| | | | |
|---|---|---|---|
| 4,135,235 | 1/1979 | Baker | 363/43 |
| 4,167,775 | 9/1979 | Baker et al. | 363/42 |
| 4,203,151 | 5/1980 | Baker | 363/43 |
| 4,220,988 | 9/1980 | Baker et al. | 363/43 |
| 5,355,297 | 10/1994 | Kawabata et al. | 363/43 |
| 5,481,448 | 1/1996 | Nakata et al. | 363/137 |
| 5,642,275 | 6/1997 | Peng et al. | 363/137 |
| 5,644,483 | 7/1997 | Peng et al. | 363/37 |
| 5,841,645 | 11/1998 | Sato | 363/43 |

OTHER PUBLICATIONS

Akira Nabae, et al., "A New Neutral–Point–Clamped PWM Inverter," IEEE–Trans. on Ind. App., vol. IA–17, No. 5, Sep./Oct. 1991, pp. 518–523.

Pradeep M. Bhagwat, et al., "Generalized Structure of a Multilevel PWM Inverter," IEEE–Trans. on Ind. App., vol. IA–19, No. 6, Nov./Dec. 1983, pp. 1057–1069.

David M. Brod, et al., "Current Control of VSI–PWM Inverters," IEEE–Trans. on Ind. App., vol. IA–21, No. 4, May/Jun. 1985, pp. 562–570.

Akira Nabae, et al., "A Novel Control Scheme for Current–Controlled PWM. Inverters," IEEE–Trans. on Ind. App., vol. IA–22, No. 4, Jul./Aug. 1986, pp. 697–701.

Jürgen K. Steinke, "Control Strategy for a Three Phase AC Traction Drive with Three–Level GTO PWM Inverter," IEEE–PESC '88, Conf. Record, Dec. 1988, pp. 431–438.

Nam S. Choi, et al., "A General Circuit Topology of Multilevel Inverter," IEEE–PESC '91, Conf. Record, Dec. 1991, pp. 96–103.

Takafumi Maruyama, et al., "A New Synchronous PWM Method for a Three–Level Inverter," IEEE–PESC '91, Conf. Proceedings, Dec. 1991, pp. 366–371.

Satoshi Ogasawara, et al., "Vector Control System Using a Neutral–Point–Clamped Voltage Source PWM Inverter," IEEE–IAS '91, Conf. Proceedings, vol. 1, Dec. 1991, pp. 422–427.

Jürgen K. Steinke, Switching Frequency Optimal PWM Control of a Three–Level Inverter, IEEE–Trans. on Power Electronics, vol. 7, No. 3, Jul., 1992, pp. 487–496.

(List continued on next page.)

*Primary Examiner*—Jeffrey Sterrett
*Attorney, Agent, or Firm*—Foley & Lardner

[57] ABSTRACT

A multilevel inverter system having four or more levels of output voltage on each inverter output line. The voltage across each of three or more series connected DC bus capacitors is provided to an inverter which is formed to have redundant switching states, such as a plurality of controlled switching devices and diodes connected in a diode-clamped multilevel inverter configuration. The switching of the switching devices is controlled to provide a selected output voltage waveform utilizing redundant switching states, when such states are available on each voltage transition, by selecting a one of the available switching states that serves to provide the desired phase-to-phase voltages and to tend to equalize the voltages across the DC bus capacitors. Active or passive rectifiers may be used to provide the DC voltage across the DC bus lines and across the DC bus capacitors. Separate rectifiers may be provided for each capacitor which are supplied from secondaries of transformers connected to the three phase input lines to provide isolation and voltage level adjustment. The multilevel inverter system provides output voltage waveforms with lower total harmonic distortion that conventional two or three level inverters, while maintaining voltage balance across the several DC bus capacitors.

34 Claims, 24 Drawing Sheets

OTHER PUBLICATIONS

Giuseppe Carrara, et al., "A New Multilevel PWM Method: A Theoretical Analysis," IEEE–Trans. on Power Electronics, vol. 7, No. 3, Jul., 1992, pp. 497–505.

Y. Tadros, et al., "Three Level IGBT Inverter," IEEE–PESC '92, Conf. Proceedings, Dec. 1992, pp. 46–51.

Takaharu Takeshita, et al., "PWM Control and Input Characteristics of Three–Phase Multi–Level AC/DC Converter," IEEE–PESC '92, Conf. Proceedings, Dec. 1992, pp. 175–180.

T.A. Meynard, et al., "Multi–Level Conversion: High Voltage Choppers and Voltage–Source Inverters," IEEE–PESC '92, Conf. Proceedings, Dec. 1992, pp. 396–403.

M. Fracchia, et al., "Optimized Modulation Techniques for the Generalized N–Level Converter," IEEE–PESC '92, Conf. Proceedings, Dec. 1992, pp. 1205–1213.

Yifan Zhao, et al., "Force Commutated Three Level Boost Type Rectifier," IEEE–IAS '93, Conf. Proceedings, Dec. 1993, pp. 771–777.

Hyo L. Liu, et al., "Three–Level Space Vector PWM in Low Index Modulation Region Avoiding Narrow Pulse Problem," IEEE–Trans. on Power Electronics, vol. 9, No. 5, Dec. 1994, pp. 481–486.

R.W. Menzies, et al., "Five–Level GTO Inverters for Large Induction Motor Drives," IEEE–Trans. on Ind. App., vol. 30, No. 4, Jul./Aug. 1994, pp. 938–943.

Michael C. Klabunde, et al., "Current Control of a 3–Level Rectifier/Inverter Drive System," IEEE–IAS '94, Conf. Proceedings, Dec. 1994, pp. 859–866.

Clark Hochgraf, et al., "Comparison of Multilevel Inverters for Static Var Compensation," IEEE–IAS '94, Conf. Proceedings, Dec. 1994, pp. 921–928.

Jie Zhang, "High–Performance Control of a Three–Level IGBT Inverter Fed AC Drive," IEEE–IAS '95, Conf. Proceedings, Dec. 1995, pp. 22–28.

Fang Zheng Peng, et al., "A Multilevel Voltage–Source Inverter with Separate DC Sources for Static Var Generation," IEEE–IAS '95, Conf. Proceedings, Dec. 1995, pp. 2541–2548.

R. Rojas, et al., "PWM Control Method for a Four–Level Inverter," IEEE–Proc. Elec. Power Appl., vol. 142, No. 6, Nov. 1995, pp. 390–396.

Jih–Sheng Lai, et al., "Multilevel Converters—A New Breed of Power Converters," IEEE–Trans. on Ind. App., vol. IA–32, No. 3, May/Jun. 1996, pp. 509–517.

Hideo Okayama, et al., "Large Capacity High Performance 3–Level GTO Inverter System for Steel Main Rolling Mill Drives," IEEE–IAS '96, Conf. Proceedings, vol. 1, Dec. 1996, pp. 174–179.

Gautum Sinha, et al., "A Four Level Rectifier–Inverter System for Drive Applications," IEEE–IAS '96, Conf. Proceedings, Dec. 1996, pp. 980–987.

Gautam Sinha, et al., "Rectifier Current Regulation in Four Level Drives," Presented at the Appied Power Electronics Conference, Feb., 1997.

Johann W. Kolar, et al., "Vienna Rectifier II—A Novel Single–Stage High–Frequency Isolated Three–Phase PWM Rectifer System," IEEE Transactions on Industrial Electronics, vol. 46, No. 4, Aug., 1999, pp. 674–691.

DC BUS VOLTAGE BALANCING AND CONTROL IN MULTILEVEL INVERTERS

This invention was made with United States government support awarded by the following agency: NSF Grant No: 9510115. The United States has certain rights in this invention.

FIELD OF THE INVENTION

This invention pertains generally to electrical power conversion systems and particularly to multilevel inverters.

BACKGROUND OF THE INVENTION

Variable frequency inverter drive systems are increasingly used for driving electrical machines. A typical drive has two or more stages of power conversion, including a rectifier to convert AC power to a constant or variable DC voltage, and an inverter for the conversion of the DC voltage to AC power of variable frequency and controlled voltage to provide the desired excitation to the electric machine. Improvements in semiconductor power devices have enabled significant improvements in such drives, as has the availability of faster microprocessors and digital signal processors (DSPs). Variable frequency drives are of particular importance for driving large industrial motors and traction motors for vehicles. The most common types of variable frequency drives have been current source inverters, conventional six-step voltage source inverters, or cycloconverters (particularly for low speed operation). Such traditional approaches have generally suffered from the limitations of high device voltage ratings and relatively poor output waveform quality, with a substantial harmonic content present in the output waveform. The availability of improved high speed semiconductor switching devices has stimulated consideration of other inverter configurations that enable the synthesizing of output voltages with lower distortion and improved waveform quality.

Several inverter topologies have been proposed to allow the realization of multilevel output voltage waveforms that more closely replicate the desired fundamental sine wave. Such approaches include, e.g., the flying capacitor topology, J. S. Lai, et al., "Multilevel Converters—A New Breed of Power Converters," Proc. IEEE-IAS' 95 Conf., pp. 2441–2548; the use of cascaded H-bridges, which has been successfully implemented in commercially available large drives (3000–4000 HP) and some static VAR compensators, F. Z. Peng, et al., "A Multilevel Voltage Source Inverter with Separate DC Sources for Static VAR Generation," Proc. IEEE-IAS' 95 Conf., pp. 2541–2548; and the so-called "Vienna" rectifier topology which uses only three active switches, J. W. Kolar, et al., "Current Handling Capability of a Neutral Point of a Three-Phase/Switch/Level Boost-Type PWM (Vienna) Rectifier," Proc. IEEE-PESC' 96 Vol. 2, pp. 1329–1336. Partially active rectifier topologies have also been demonstrated, Y. Phao, et al., "Forced Commutated Three-Level Boost Rectifier," IEEE Trans. on Industry Applications, Vol. 31, No. 1, January/February 1995, pp. 151–161.

Another type of multilevel drive configuration, based on a neutral point clamped inverter topology, is described in a paper by A. Nabae, et al., "A New Neutral Point Clamped PWM Inverter," IEEE Trans. on Industry Applications, Vol. IA-17, No. 5, September/October 1981, pp. 518–523. See also, U.S. Pat. Nos. 4,135,235, 4,167,775 and 4,220,988 to Baker and Baker, et al. The neutral point clamped (NPC) topology is an extension of the conventional voltage source inverter but with the possibility of doubling the voltage rating because the clamp diodes serve to limit the voltage stress on each device. A three level NPC converter is capable of producing 19 voltage vectors as opposed to the 7 vectors of conventional voltage source inverters. The NPC inverter provides "redundant switching states" because there are multiple means of generating some of the voltage vectors. The greater number of voltage vectors implies that, for a constant device switching frequency, the voltage total harmonic distortion from the NPC inverter should be lower than for a conventional voltage source inverter. Multilevel inverters of this type also have additional advantages that are very significant in high power applications. One example is that the dv/dt stresses on the switching devices are reduced and, in addition, the lower voltage steps at each switching event reduces the wear and tear on the winding insulation, thus improving long-term reliability. Reduced voltage waveform distortion reduces the output filtering requirements, resulting in additional cost savings. The NPC inverter topology can be implemented in inverters having greater than three levels, which are commonly referred to as diode clamped multilevel inverters (DCMLI). Because of the inherently higher voltage capabilities of such inverters, they have initially found applications in power utilities as static VAR compensators.

For a given system voltage rating and number of levels, it can be shown that the DCMLI topology has the minimum possible total active switch rating, a very significant performance and cost component of high power drives. While three level inverters have been common, four level and higher level inverter systems have also been proposed; see, e.g., Gautam Sinha, et al., "A Four Level Rectifier-Inverter System for Drive Applications," Proc. IEEE-IAS' 96 Conf., 1996, pp. 980–987.

Multilevel drives use two or more DC bus capacitors connected in series across the outermost DC bus lines from the rectifier, with the multilevel inverter connected to receive the DC power across each of the capacitors, each of which forms one of the voltage levels in the output voltage waveform. Unequal power draw from the capacitors can lead to unequal voltages across the capacitors, and consequent deviation of the output voltage waveform from the desired waveform. Three level inverters have been reported which overcome the capacitor voltage balancing problem in various ways, including utilizing inverter switching strategies based on look-up table values, Jie Zhang, "High Performance Control of a 3 Level IGBT Inverter Fed AC Drive," Proc. IEEE-IAS' 95 Conf., 1995, pp. 22–28; by the addition of zero sequence components, J. K. Steinke, "Control Strategy for a Three Phase AC Traction Drive with Three Level GTO PWM Inverter," Proc. IEEE-PESC' 88 Conf., 1988, pp. 431–438; and through a combination of space vector control and redundant state selections, A. Nabae, et al., supra. While such schemes have been utilized for three level inverters, they are not readily extended to four and higher level inverters. Four level inverters have the advantage of permitting the use of smaller, hence lower cost, devices, and offer the possibility of being more directly connected to high voltage supply lines since each device is required to switch a smaller fraction of the total supply voltage. However, unbalances in the capacitor voltages can produce unequal device stresses in the inverter, which can lead to device failure as well as degradation of waveform quality.

SUMMARY OF THE INVENTION

In accordance with the invention, a multilevel inverter system is provided which allows high voltage, high power applications with low total harmonic distortion in the output waveforms. Four level and higher level inverter systems incorporating the invention allow the use of lower rated and thus lower cost switching devices. The inverter is operated to make use of available redundant switching states to synthesize the desired output waveforms while also tending to balance the voltages across the series connected DC bus capacitors that supply voltage to the inverter. The balancing of the voltages across the DC bus capacitors in accordance with the invention reduces the stresses imposed on the switching devices in the inverter as well as improving the waveform quality by maintaining the capacitor voltages near their nominal values.

The inverter system in accordance with the invention includes at least three DC bus capacitors connected in series at nodes between the capacitors and across the high and low DC bus lines. A rectifier is connected to the DC bus lines to supply rectified DC power thereto. The rectifier can be a passive rectifier converting AC power at its input to a DC power across the bus lines or an active two level or multi-level rectifier providing controlled DC voltage across each of the capacitors individually. For isolation and voltage control, transformers may be connected between the AC power system and the rectifier to supply AC power to individual rectifiers for each capacitor.

The multilevel inverter is connected to the high and low DC bus lines and to bus lines connected to the nodes between the capacitors. The inverter has redundant switching states, and may be formed, for example, of a plurality of controlled switching devices and diodes which are connected in a diode-clamped multilevel inverter configuration to provide three-phase power on three output lines with at least four voltage levels on each output line. The inverter is controlled by a controller that receives signals indicative of the voltages across the DC bus capacitors and the load currents, and the controller is connected to the switching devices of the inverter. The controller controls the switching of the switching devices to provide a selected output waveform at the output lines by utilizing redundant switching states of the inverter, when such states are available, on each output voltage transition. The control means selects a one of the available redundant switching states that serves to provide the desired phase-to-phase voltages and to tend to equaline the voltages across the DC bus capacitors.

A criterion for determination of the switching state to be utilized for a four level inverter is evaluation of the quantity $Q = \Delta V_{C1} I_1 + \Delta V_{C2} I_2 + \Delta V_{C3} I_3$, with a one of the available redundant switching states being selected for which the quantity Q is $\geq 0$, wherein $\Delta V_{C1}$, $\Delta V_{C2}$ and $\Delta V_{C3}$ are the respective differences between the measured voltage across each capacitor and the nominal target voltage across each capacitor, and $I_1$, $I_2$ and $I_3$ are the DC bus currents for four level inverter systems having three series connected capacitors determined for the load currents and corresponding to the selection of a particular switching state.

While the use of the foregoing criterion will tend to balance capacitor voltages under most conditions, it will not rigorously guaranty that capacitor voltages will be driven toward balance under all conditions. In accordance with the invention, a criterion for a sufficient condition for voltage balancing is that $Q(h_a, h_b, h_c) = \max \{\Delta V_{c1} i_{c1}, \Delta V_{c2} i_{c2}, \Delta V_{c3} i_{c3}\} \leq 0$, where max $\{\}$ means the maximum of the set within the brackets and $i_{c1}$, $i_{c2}$, and $i_{c3}$ are the capacitor currents determined based on load currents and the particular switching state being evaluated. This criterion may be extended to higher level inverters. For an n level inverter:

$h_a, h_b, h_c = 0, 1, \ldots, n-1$

The switching state is preferably selected for which $Q(h_a, h_b, h_c)$ is most negative, which corresponds to the state which will drive the capacitor voltages toward balance most quickly.

The capacitor voltages used to evaluate the foregoing criteria may be obtained from, e.g., direct measurements of the voltages across the capacitors. The DC bus currents (which are an indication of the capacitor currents) or the capacitor currents may be derived from measurements of the load currents and the switching state of the inverter.

At lower modulation depths, typically less than a selected modulation depth value of about 0.7, the inverter is preferably controlled to switch under pulse width modulation, e.g., sine-triangle pulse width modulation. At higher modulation depths, the inverter may be controlled to switch under space vector modulation, for example, at four level space vector modulation where redundant states are available, and at two level space vector modulation at the highest modulation depths where redundant states are not available.

Further objects, features and advantages of the invention will be apparent from the following detailed description when taken in conjunction with the accompanying drawings.

DETAILED DESCRIPTION OF THE INVENTION

Multilevel inverters are well-suited to, and thus are increasingly used in, high voltage, high power applications, especially for utility power conversion. Three level inverter drives are also being increasingly used as high power induction motor drives. Four level (and higher level) drives have the additional advantage over three level drives of permitting the use of even lower rated, lower cost switching devices. Link voltage balancing is a serious constraint in the operation of such multilevel inverter based drives. In particular, it is known that at higher modulation depths, the four level inverter loses its capability to generate low distortion voltage waveforms and concurrently balance the DC link capacitor voltages, leading to poor DC bus voltage regulation and device utilization. The present invention enables an inverter of four or higher levels to achieve desired output voltage generation while obtaining link voltage balancing at higher modulation depths, reducing the cost, and improving the performance of the drive, thereby making such multilevel drive configurations much more viable for high performance applications such as high power industrial and traction drives.

Figure 1:
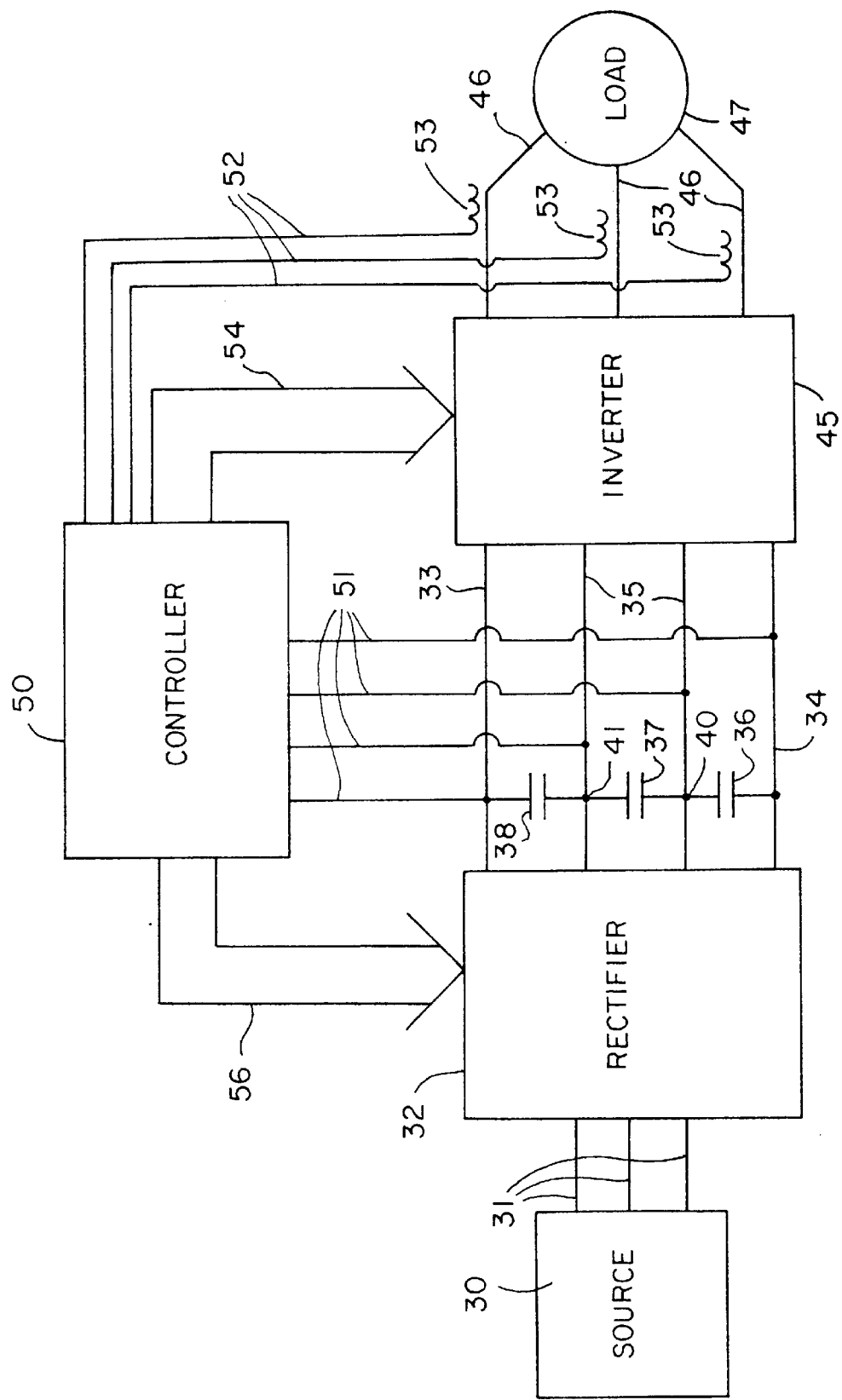
FIG. 1 is a block diagram of a multilevel inverter drive system in accordance with the invention.

For purposes of exemplifying the invention, the basic structure of a four level inverter drive system in accordance with the invention is shown generally in FIG. 1. It is understood that the present invention can be implemented in five level and higher level inverter systems. Power from a three-phase source 30 (e.g., utility power) is supplied on input lines 31 to a rectifier 32. The rectifier 32 provides DC power on high and low DC bus lines 33 and 34 across which three DC bus capacitors 36, 37 and 38 are connected in series. Depending on the structure of the rectifier 32, rectified DC power at intermediate voltage levels may be supplied to the node 40 between the capacitors 36 and 37 and to the node 41 between the capacitors 37 and 38. The high and low DC bus rails 33 and 34 are connected to a four level inverter 45 which provides three-phase output power on output lines 46 to a three-phase load 47 (e.g., a motor). The voltages at the nodes 40 and 41 are also provided to the inverter 45 by intermediate DC bus lines 35. A controller 50 is connected by sensing lines 51 to the DC bus rails 33 and 34 and to the DC bus lines 35 connected to the nodes 40 and 41 to provide signals indicative of the voltage across the capacitors 36, 37 and 38. The controller 50 may also receive signals on lines 52 from current sensors 53 on the output lines 46 which indicate load currents, and which thus are indicative of currents through the DC bus capacitors, as discussed further below. The controller 50 provides output signals on lines 54 to the controlled switching devices within the inverter 45 to generate the desired three-phase output voltages on the output lines 46 and, in accordance with the invention, to switch in a manner such that the voltages across the DC bus capacitors 36, 37 and 38 are substantially balanced. In an optional configuration of the invention, the rectifier 32 may include active switching devices which are also controlled by the controller 50 with control signals provided on output lines 56.

Figure 2:
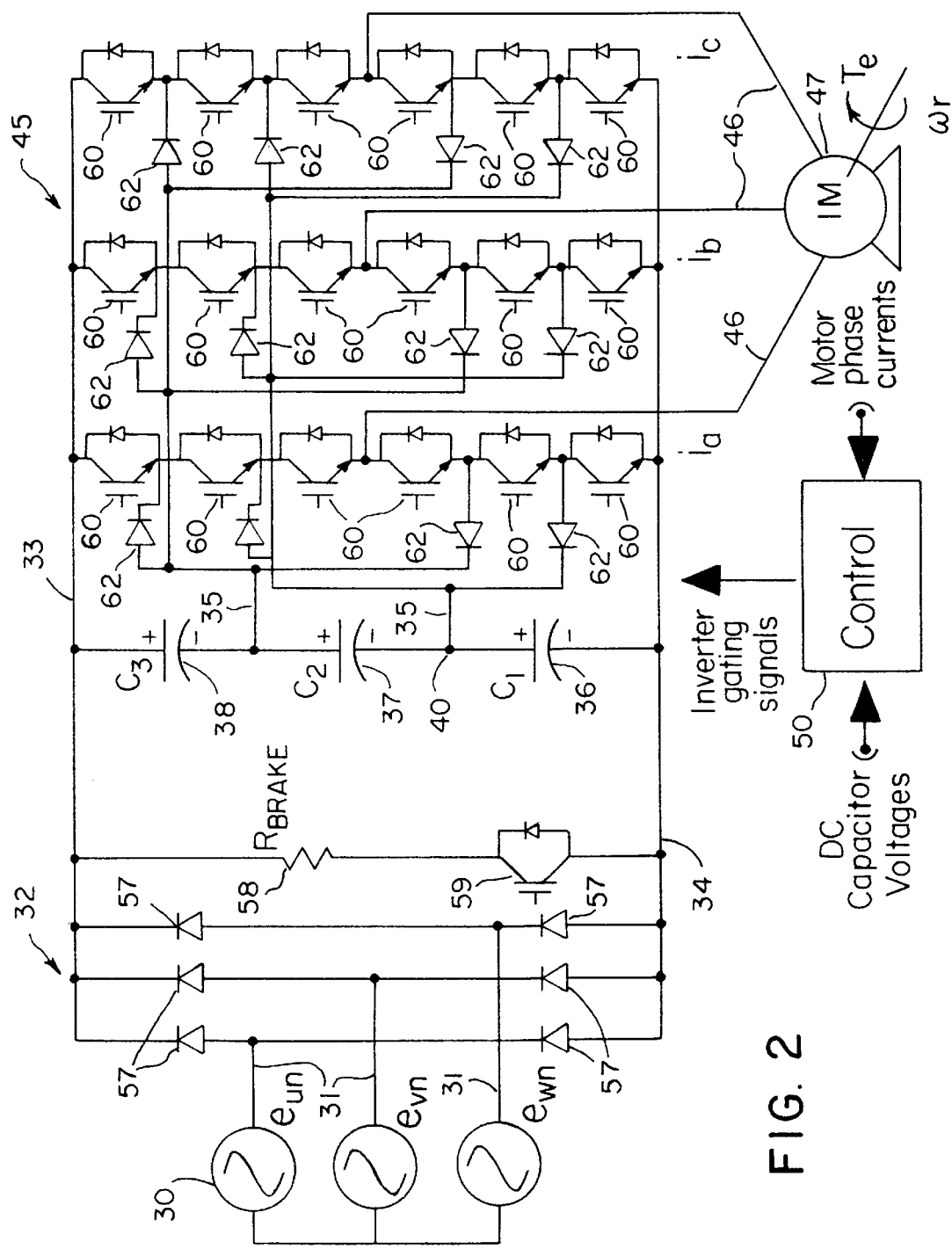
FIG. 2 is a schematic diagram of a four level inverter drive system in accordance with the invention.
Figure 3:
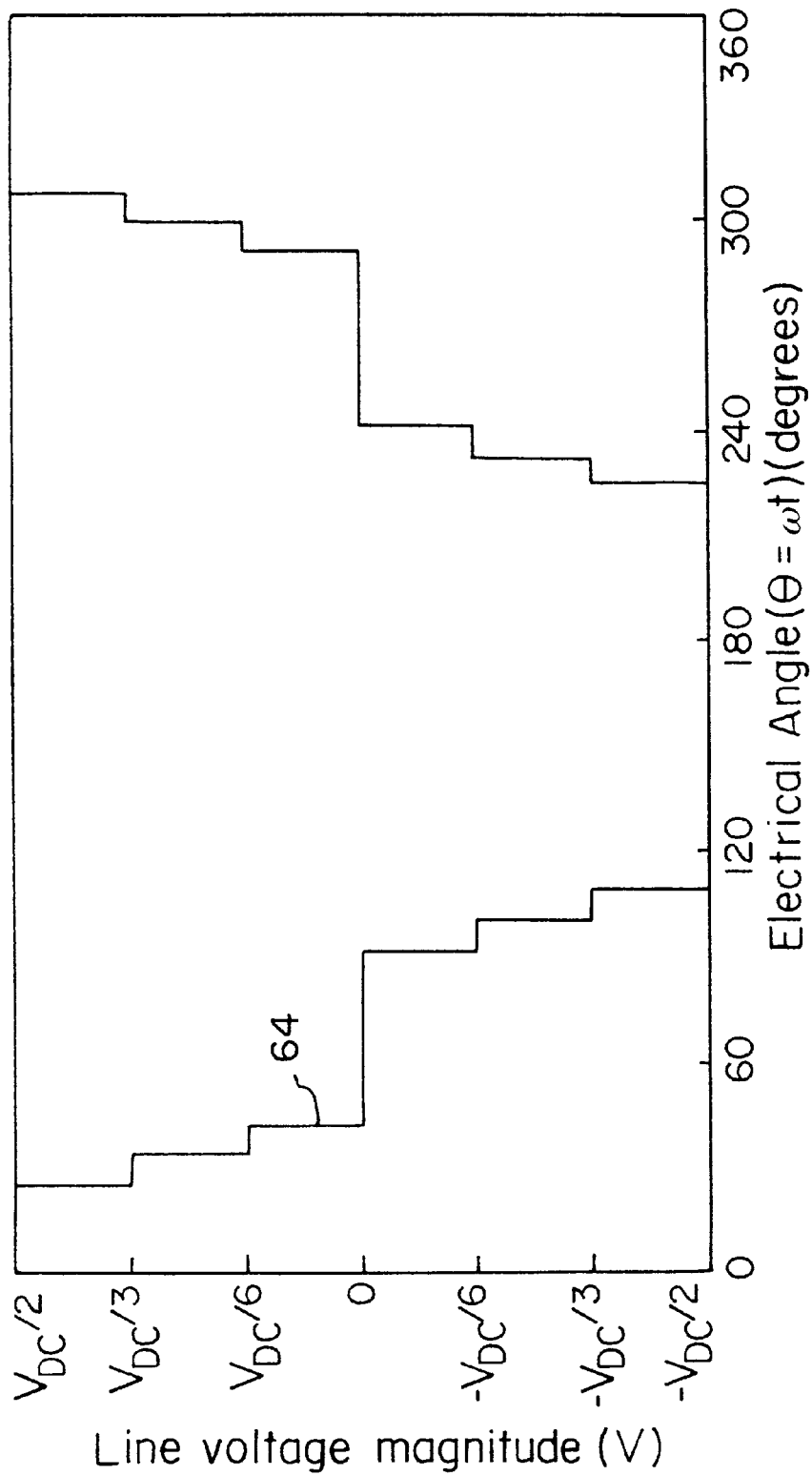
FIG. 3 is a graph showing an exemplary waveform of the line-to-line voltage developed by the four level inverter of the invention.

The implementation of an illustrative four level inverter with a passive rectifier 32 in accordance with the invention is illustrated in FIG. 2. The rectifier 32 is formed of a full bridge of diodes 57 which rectifies the input power from the source, e.g., three-phase utility power at 480 V, 60 Hz, to a DC voltage, $V_{DC}$, which is applied across the high and low DC bus lines 33 and 34. For braking purposes, a power dissipation resistor 58 and controlled switch 59 are connected across the DC bus lines 33 and 34 to allow selective discharge of power. The voltage across the lines 33 and 34 distributes across the three series connected capacitors 36, 37 and 38, which all preferably have the same nominal capacitance value. A diode (not shown) may be connected in antiparallel with each of the capacitors 36–38 to provide protection for the capacitors during power down where a passive rectifier as illustrated in FIG. 2 is used. The inverter 45 is a multilevel inverter with redundant switching states. For exemplification, the inverter 45 may be arranged in a diode clamped multilevel inverter topology composed of controlled switching devices 60, e.g., insulated gate bipolar transistors (IGBTs), with anti-parallel diodes connected around each switching device. The inverter 45 is connected to the DC bus lines 33 and 34 and pairs of switching devices 60 are connected via diodes 62 and the bus lines 35 to the nodes 40 or 41. An example of the multiple-step line voltage developed between any two of the output lines 46 of the inverter 45 is shown by the graph labeled 64 in FIG. 3.

Figure 4:
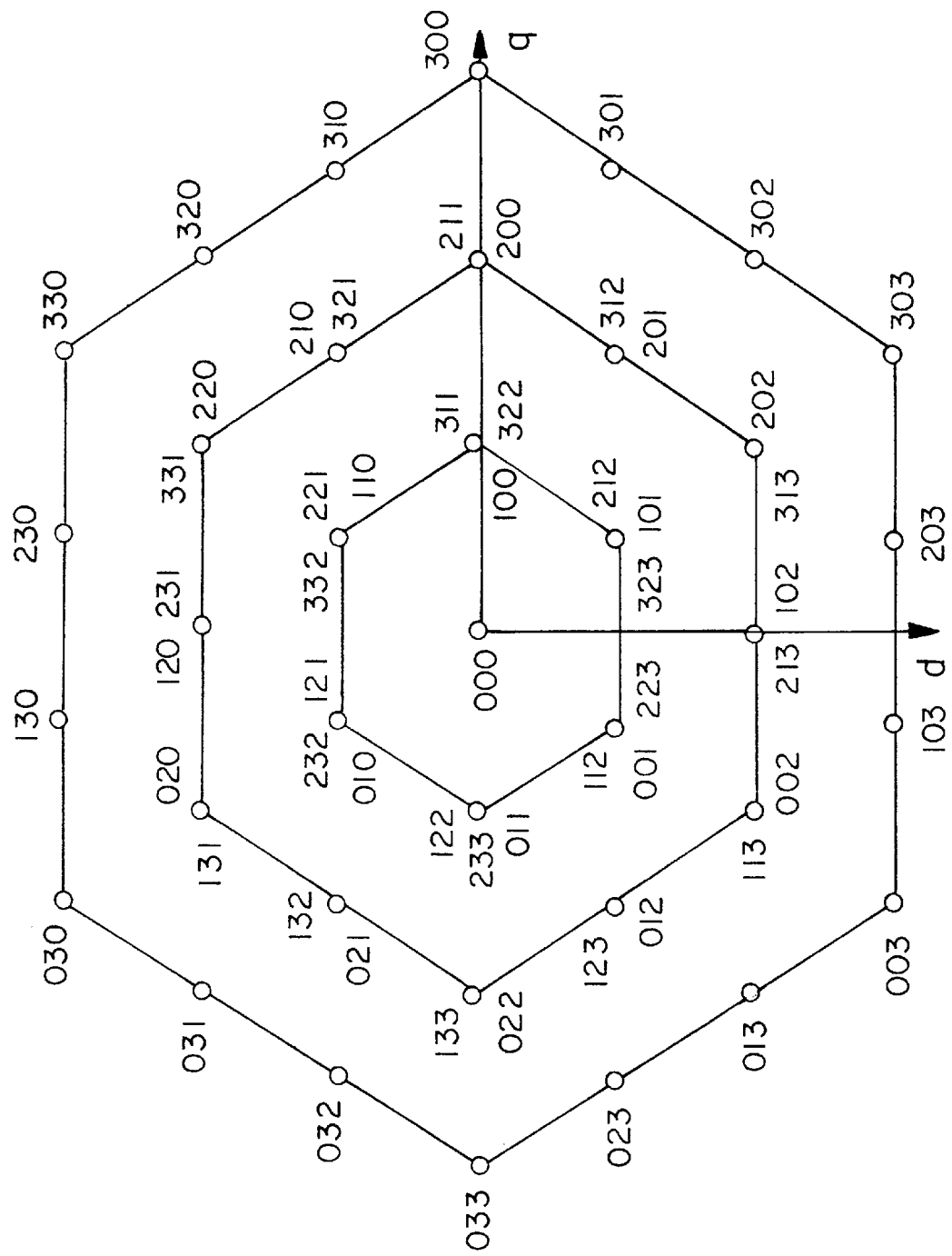
FIG. 4 is a diagram showing the available switching states of a four level inverter in accordance with the invention.
Figure 6:
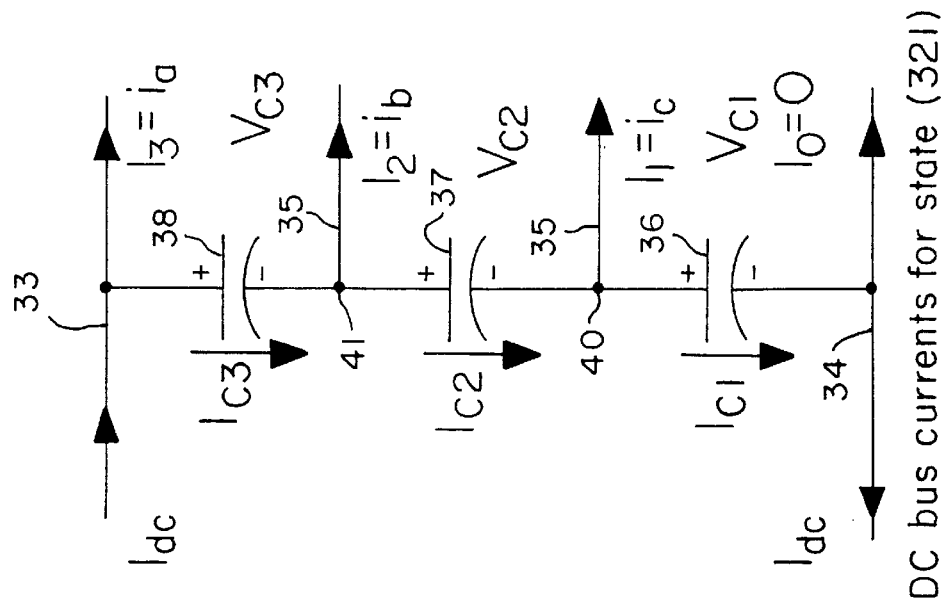
FIG. 6 is a simplified circuit schematic showing the currents through and the voltages across the DC bus capacitors for state (321) of the four level inverter.

The inverter modulation scheme for controlling the switches 60 determines the output voltage that the inverter 45 develops. In a four level diode clamped inverter, a voltage vector may be developed by up to four equivalent switching states, which are termed redundant states, as shown in FIG. 4. Redundant states, however, differ in the charging current they produce in the capacitors 36–38. For example, referring to FIG. 5, selection of state (210) leads to the following DC bus currents: $I_0=i_c$, $I_1=i_b$, $I_2=i_a$ and $I_3=0$; (where $i_a$, $i_b$ and $i_c$ are the load currents) but its redundant state (321) produces DC bus currents $I_0=0$, $I_1=i_c$, $I_2=i_b$, $I_3=i_a$ as shown in FIG. 6. Both switching states, however, produce the same output voltage vector ($V_{AB}=V_{DC}/3$, $V_{BC}=V_{DC}/3$, $V_{CA}=-2\ V_{DC}/3$) and, to the load, are indistinguishable. For this example, it is seen that if $i_a>0$, $i_b<0$, $i_c<0$ then selecting state (210) will produce no change in the capacitor 38 voltage $V_{C3}$, will charge up the voltage $V_{C2}$ across capacitor 37, and will discharge the voltage $V_{C1}$ across the capacitor 36, whereas selecting state (321) will charge up the capacitor voltage $V_{C3}$, discharge the capacitor voltage $V_{C2}$, and the capacitor voltage $V_{C1}$ will stay unchanged.

In accordance with the invention, a first criterion for balancing capacitor voltages is to evaluate the quantity $Q=\Delta V_{C1}\ I_1+\Delta V_{C2}\ I_2+\Delta V_{C3}\ I_3$ for each new switching state. If the inverter is required to produce, for example, line voltages ($V_{DC}/3$, $V_{DC}/3$, $-2\ V_{DC}/3$) it can do so by selecting state (210) or (321) (see FIG. 4). If $Q(210)\geq0$, capacitor charging currents of the appropriate polarity are produced which tend to balance the link voltages. $\Delta V_{C1}$, $\Delta V_{C2}$ and $\Delta V_{C3}$ are the deviations of each capacitor voltage from its nominal set point=$V_{DC}/3$, i.e., $\Delta V_{C1}=V_{C131}\ v_{DC}/3$, etc. For instance, if $V_{DC}=651$ V and the measured capacitor voltages are $V_{C1}=225$ V, $V_{C2}=205$ V and $V_{C3}=221$ V, then $\Delta V_{C1}=8$ V, $\Delta V_{C2}=-12$ V, $\Delta V_{C3}=4$ V, and Q (210)=0. On the other hand, if $Q(321)<0$, selecting state (321) will only exacerbate the link voltage unbalance and thus this state should not be selected.

While the use of the foregoing criterion for selecting switching states will tend to balance capacitor voltages under most conditions, it will not rigorously guaranty that capacitor voltages will be driven toward balance under all conditions. To develop such a criterion, it is noted that each capacitor voltage deviation and the charging current through each capacitor should be opposite in polarity at each switching event to ensure that the capacitor voltages will tend to be balanced. That is, for each capacitor at the selected switching state ($h_a$, $h_b$, $h_c$) at a particular time, in terms of the capacitor voltages and currents: $\Delta V_{cj}\ I_{cj}\ (h_a,\ h_b,\ h_c)\leq 0$, $j=1,2,\ldots,n$.

Thus, a criterion for a sufficient condition for voltage balancing for an n level inverter is that $Q(h_a, h_b, h_c)=\max\{\Delta V_{c1}i_{c1}, \Delta V_{c2}i_{c2}, \ldots, \Delta V_{c(n-1)}i_{c(n-1)}\}\leq 0$, where max { } means the maximum of the set in brackets. For an n level inverter:

$h_a$, $h_b$, $h_c=0, 1, \ldots, n-1$

The switching state is preferably selected for which Q ($h_a$, $h_b$, $h_c$) is most negative, which corresponds to the state which will drive the capacitor voltages toward balance most quickly.

The capacitor voltages used to evaluate the foregoing criteria may be obtained from direct measurements of the voltages across the capacitors. The DC bus currents or the capacitor currents for each switching state being evaluated may be obtained from measurements of the load currents. For a four level inverter, the DC bus currents $I_1$, $I_2$, $I_3$ can be calculated from the load currents, $i_a$, $i_b$, $i_c$, for each switching state $h_a$, $h_b$, $h_c$ as:

$I_1=\delta(h_a-1)i_a+\delta(h_b-1)i_b+\delta(h_c-1)\ i_c$
$I_2=\delta(h_a-2)i_a+\delta(h_b-2)i_b+\delta(h_c-2)\ i_c$
$I_3=\delta(h_a-3)i_a+\delta(h_b-3)i_b+\delta(h_3-3)\ i_c$ where $\delta(\neq 0)=0$, $\delta(0)=1$.

The capacitor currents $i_{c1}$, $i_{c2}$, $i_{c3}$ can be derived from the DC bus currents as:

$i_{c3}\ (h_a, h_b, h_c) = I_{react} - I_3\ (h_a, h_b, h_c)$
$i_{c3}\ (h_a, h_b, h_c) = I_{react} - I_3\ (h_a, h_b, h_c) - I_2\ (h_a, h_b, h_c)$
$i_{c3}\ (h_a, h_b, h_c) = I_{react} - I_3\ (h_a, h_b, h_c) - I_2\ (h_a, h_b, h_c) - I_1\ (h_a, h_b, h_c)$ $I_{rect}$ is the rectifier DC current ($I_{dc}$ in FIGS. 5 and 6) and ($h_a$, $h_b$, $h_c$) is the inverter switching state. These calculations are readily extended to higher level inverters and to rectifier systems supplying power to the intermediate nodes between the capacitors. By repeating this process of evaluation at every switching event, link voltage balancing is guaranteed so long as redundant states are available.

If the inverter is required to produce the largest possible voltages, the controller must select the switching states which lie on the outermost hexagon in FIG. 4, for which redundant states are not available for balancing link voltages. In accordance with the invention, voltage balancing can then be carried out with a modified space vector modulation scheme which is based on the observation that the switching states shown in FIG. 7 form a set of benign states that can be used to balance link voltages. At higher modulation depths, the voltage reference lies in one of the triangles shown in FIG. 7. The dwell times at each voltage vector are determined in a manner similar to the two level inverter space vector modulation case. For example, a decision regarding selection of either state (120) or (231) is made by again evaluating Q(120) and Q(231). Since the size of the triangles is small relative to the hexagon, the voltage waveform distortions as well as switching losses are low. The voltage balancing scheme does not add to the average switching frequency, which is a significant consideration in keeping losses low. Also, the control is independent of the type of passive rectifier 32 selected in a particular implementation, i.e., the balancing algorithm would not change if a phase controlled rectifier bridge or a 12 pulse bridge is used.

Figure 8:
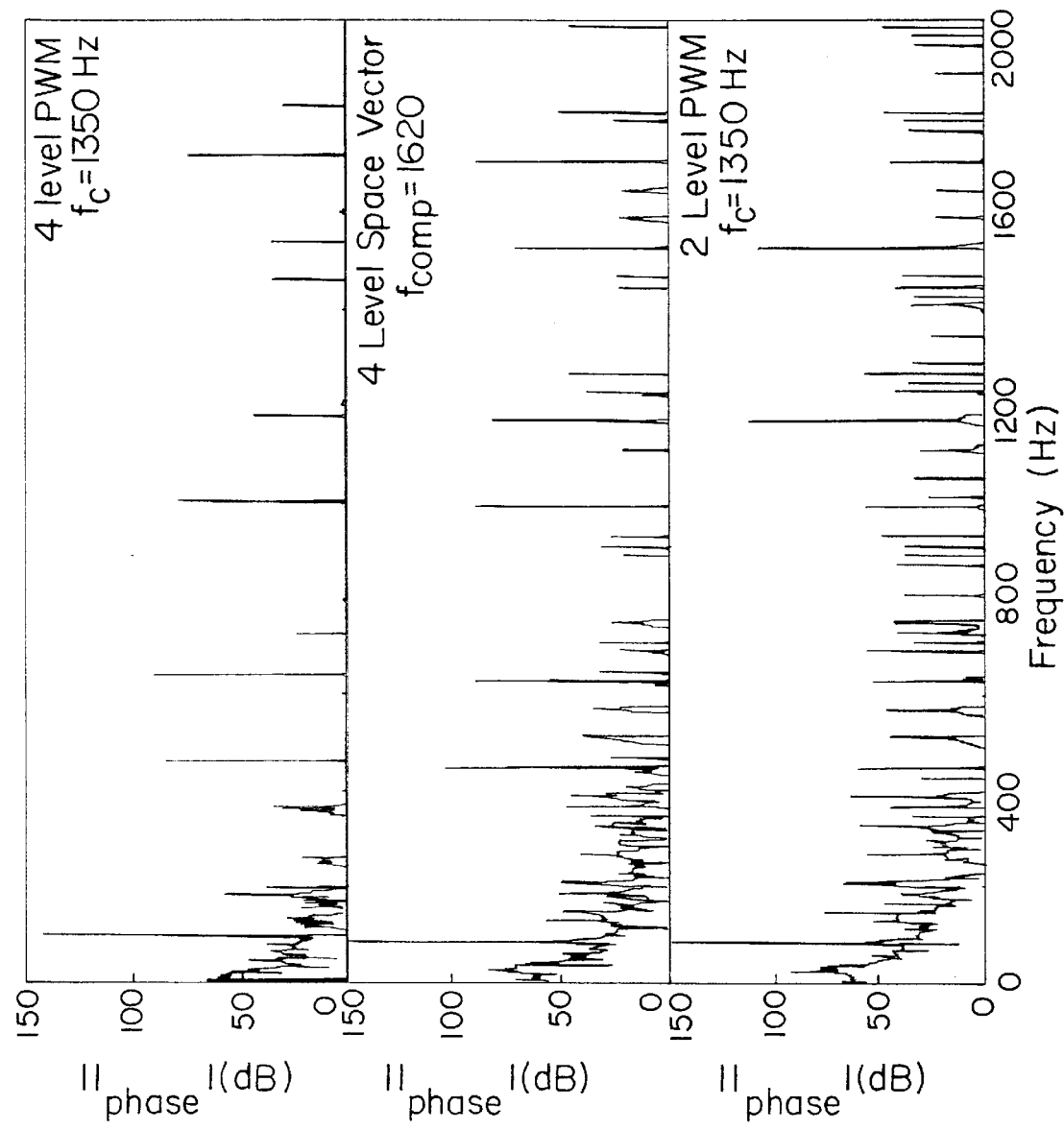
FIG. 8 are diagrams illustrating the load phase current spectra of the output of a four level inverter in accordance with the invention under four level pulse width modulation (PWM) and four level space vector modulation, and also a diagram of the spectrum for the output of a conventional inverter operating under two level PWM.

FIG. 8 illustrates, for comparison purposes, the simulated load current phase spectrum using four level PWM, four level modified space vector modulation, and the conventional two level PWM at a specific operating point (90 Hz, 460 $V_{rms}$). It is apparent from these spectra that significantly fewer harmonics are present in the 4 level PWM and 4 level space vector modulation as compared to 2 level PWM.

The following discussion explains the theory underlying DC link capacitor voltage balancing in further detail.

Figure 5:
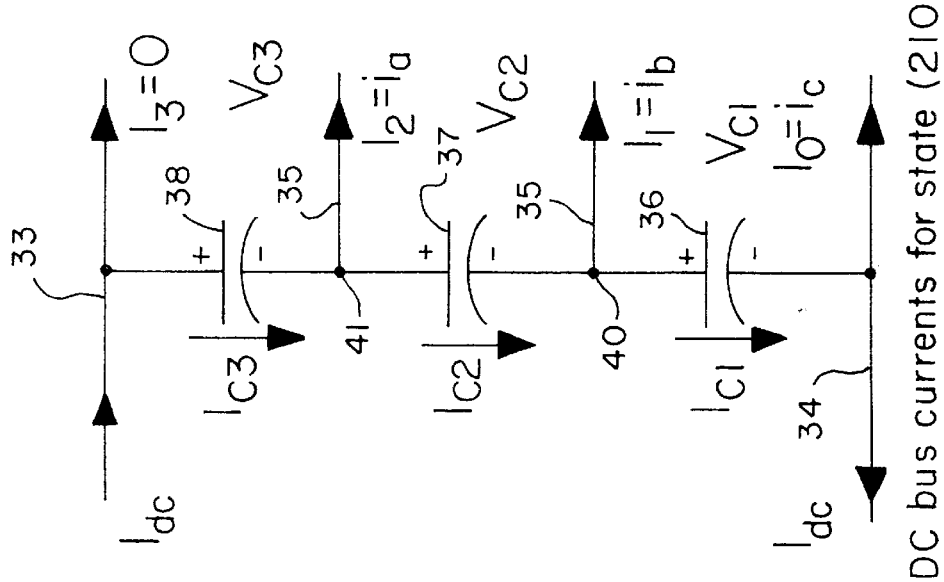
FIG. 5 is a simplified circuit schematic showing the currents through and voltages across the DC bus capacitors for state (210) of the four level inverter.

From FIGS. 5 and 6, and generalizing for an n level DC bus, it can be seen that under nominal operating conditions the capacitor voltages are balanced, i.e.:

$$V_{C1}=V_{C2}=\ldots=V_{C_{n-1}}=V_{DC}/(n-1) \qquad (1)$$

The DC bus currents $I_1$, $I_2$, $I_3$ (or more for inverters with more than four levels) can be expressed in terms of the phase switching functions and the load currents, $i_a$, $i_b$, $i_c$, as:

$$I_k=\delta(h_a-k)i_a+\delta(h_b-k)i_b+\delta(h_c-k)i_c \qquad (2)$$

where $h_a$, $h_b$, $h_c=0, 1, \ldots, n-1$; $k=1, 2, \ldots, n$; and $\delta(0)=1$, $\delta(\neq 0)=0$.

Figure 9:
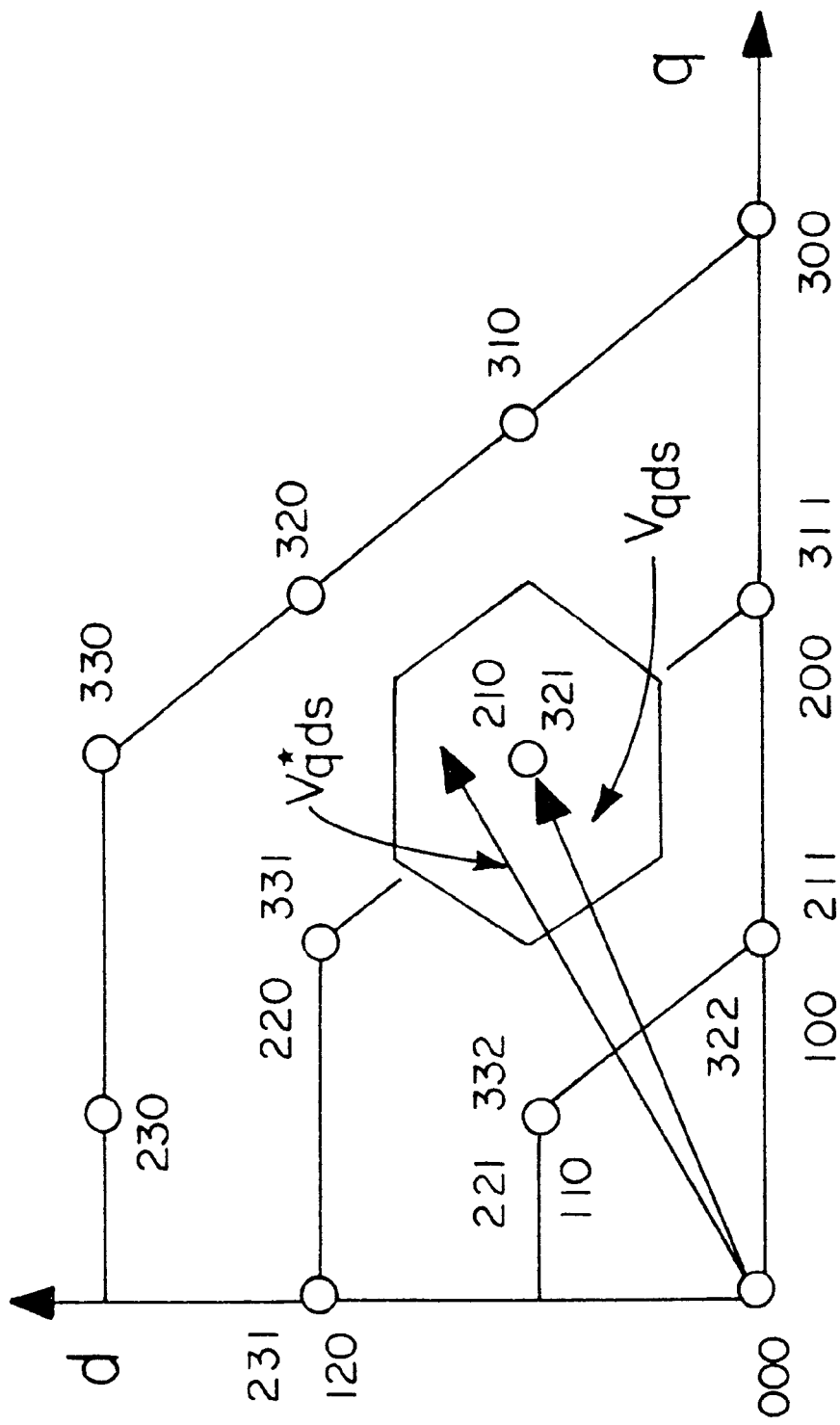
FIG. 9 is a diagram illustrating the selection of a voltage vector in the multilevel inverter of the invention.

The phase switching functions are determined by the voltage vector required by the modulation process. FIG. 4 shows the available switching states of a four level inverter in the dq0 plane. Referring to FIG. 9, as a result of any modulation process, if the reference vector lies within the shaded hexagonal region, it is best approximated by the voltage vector:

$$\overline{V}_{qds} = \frac{V_{DC}}{3}\left(1 + j\frac{1}{\sqrt{3}}\right) \quad (3)$$

It is evident that the required voltage vector can be produced by two switching states, i.e., (210) and (321). In the first case, from (2), $I_1=i_b$, $I_2=i_a$ and $I_3=0$, whereas in the second case $I_1=i_c$, $I_2=i_b$ and $I_3=i_a$. A necessary condition for link voltage balancing is $$\Delta V_1 I_1 + \Delta V_2 I \geq 0 \quad (4)$$

where $\Delta V_1 = \Delta V_{C1} = V_{C1} - \frac{V_{DC}}{3}, \quad \Delta V_2 = V_{C1} + V_{C2} - \frac{2V_{DC}}{3}$ In equation (4), $I_1 = I_1(h_a, h_b, h_c)$, etc., i.e., the DC bus currents depend on the switching function selected. This principle can be generalized for an n level DC bus and the corresponding necessary condition for balancing can be it stated as:

$$\Delta V_1 I_1 + \Delta V_2 I_2 + \ldots + \Delta V_{n-1} I_{n-1} \geq 0 \quad (5)$$

Eq. (5) is also a sufficient condition for link voltage balancing for n=3. For $n \geq 4$, Eq. (5) is a necessary but not a sufficient condition and cannot guarantee that the DC voltages will be balanced.

As explained above, a sufficient condition for link voltage balancing for $n \geq 4$ is that:

$$\max\{\Delta V_{C1} i_{c1}, \Delta V_{c2} i_{c2}, \ldots, \Delta V_{c(n-1)} i_{c(n-1)}\} \leq 0 \quad (6)$$

where $i_{c1}$, $i_{c2}$, etc. are the capacitor currents for the switch state selected, calculated from the measured load currents.

Physically, applying (6) corresponds to selecting that switching state which will not cause an increase in the voltage unbalance. If this condition is consistently applied, starting from balanced conditions the capacitor voltages stay balanced within a tolerance level.

Figure 10:
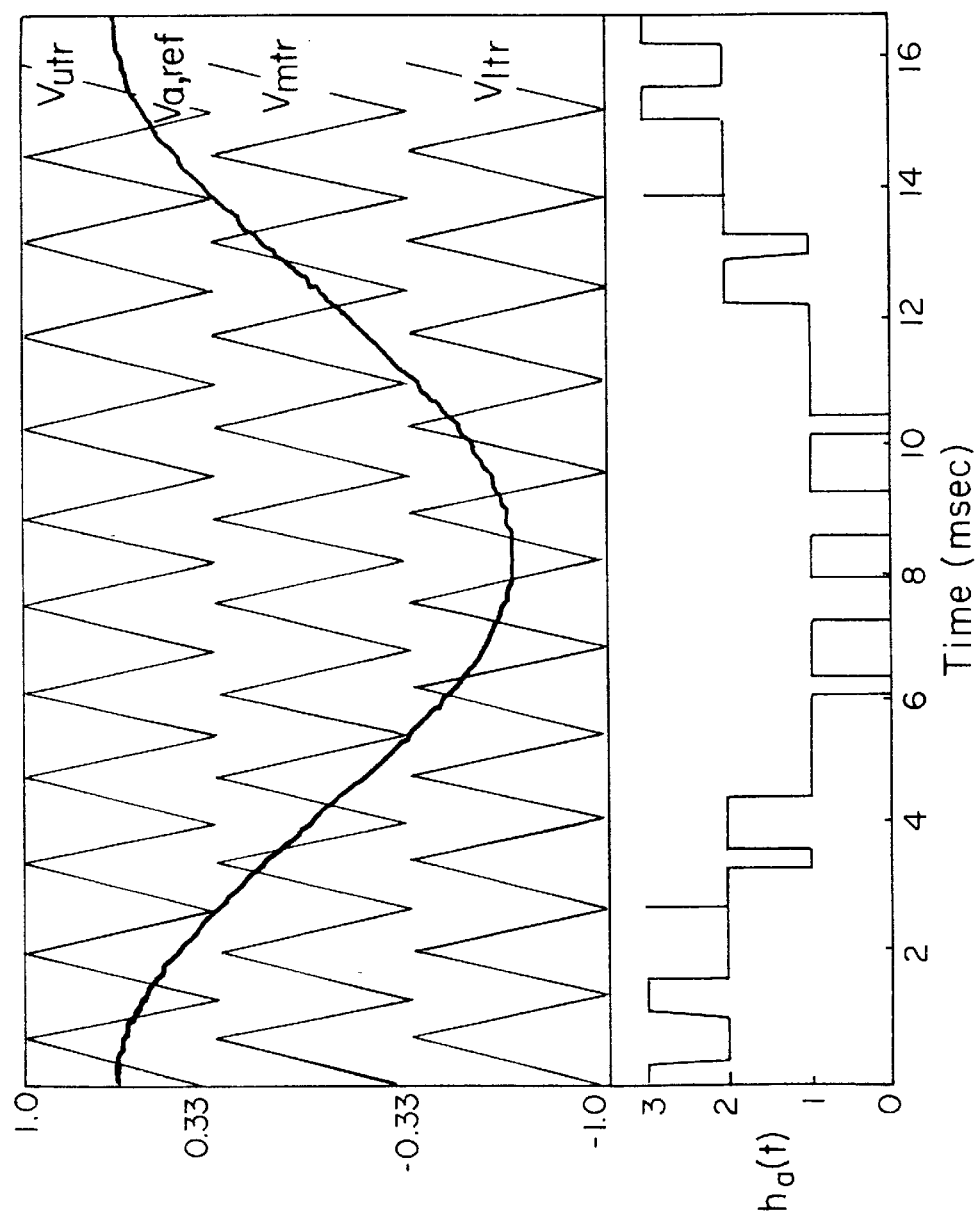
FIG. 10 are diagrams showing the carrier and reference voltage waveforms and phase A switching functions for a four level PWM modulated inverter in accordance with the invention.

One of the main advantages of the multilevel inverter (MLI) is that it is able to produce low total harmonic distortion (THD) voltage waveforms. This is because the MLI is characterized by a large number of voltage vectors: (1+3n(n−1)). The distribution of the voltage vectors is best exemplified by a consideration of the four level inverter switching states in FIG. 4. It is evident that the density of voltage vectors is greatest towards the interior of the hexagon, which corresponds to operation at lower modulation depths (at constant DC bus voltage). However, even at higher modulation indices, there are still a large number of voltage vectors, which is the primary reason why the THD of the MLI voltages is lower than conventional voltage source inverters. At higher modulation depths, link unbalance is bound to occur. The magnitude of the unbalance depends on the load power factor, and the modulation depth controls the rate at which the unbalance increases. In the following discussion, a multilevel sine-triangle pulse width modulation (PWM) scheme is used to control the inverters, since it is representative of most modulation schemes. FIG. 10 shows the carrier waveforms $V_{utr}$, $V_{mtr}$, $V_{ltr}$, phase A reference voltage waveform $V_{a,\,ref}$ and phase A switching function $h_a$ for a four level PWM. According to this scheme, the phase A switching functions are given by:

$$h_a = 3 \text{ if } v_{a,\,ref} \geq v_{utr} \quad (7.\text{i})$$

$$h_a = 2 \text{ if } v_{utr} \geq v_{a,\,ref} \geq v_{mtr} \quad (7.\text{ii})$$

$$h_a = 1 \text{ if } v_{mtr} \geq v_{a,\,ref} \geq v_{ltr} \quad (7.\text{iii})$$

$$h_a = 0 \text{ otherwise} \quad (7.\text{iv})$$

The phase switching functions of the other two phases are similarly defined.

For sufficiently high modulation depths, the average charge $<I_1>$ asymptotically approaches 0. This is consistent with the fact that for a high enough modulation depth ($m_a > 1.33$), only $S_{30}$ states, i.e., those corresponding to the two level inverter, are selected and hence no unbalance can result. At lower $m_a$, although the tendency to unbalance is greatest, many more redundant states are available to quickly redistribute the charge.

As the carrier frequency is varied, the dominant unbalancing tendency occurs at lower modulation depths, which can be easily remedied by redundant state selection. At higher modulation indices, the tendency to unbalance is not significantly affected by the frequency ratio, hence the carrier frequency can be selected to optimize the voltage THDs and the switching losses rather than balancing the link voltages.

There is an unbalance introduced due to the asymmetric currents being drawn from the capacitors. In the limiting case when only the $S_{31}$, $S_{32}$ and $S_{30}$ states are used, the average values of the DC currents are given by:

$$\langle I_1 \rangle = -\langle I_2 \rangle = 6 I_m \cos\phi \sin\left(\frac{\lambda}{2}\right) \cos(2\pi/3 - \lambda); \quad (8)$$

where $\lambda = 19.11°$ and, thus $$<i_{c2}> = <i_{c3}> - <I_2> = <i_{c3}> - 0.188 I_m \cos\phi \quad (9)$$

$$<i_{C1}> = <i_{C3}> - (<I_2> + <I_1>) = <i_{C3}> \quad (10)$$

Thus, the middle capacitor 37 tends to discharge faster than the outer capacitors 36 and 38 under any modulation scheme for any real load because $\cos\phi \neq 0$. Also, there is symmetry in the charging of $V_{C1}$ and $V_{C3}$.

In a five level inverter, the tendency of the midpoint node of the DC bus to drift is much lower than that of the other two neutral nodes. Again, at lower modulation indices, the midpoint voltage drift is easily countered by redundant state selection. Also, the frequency ratio does not produce significant variations in the unbalancing characteristics. As with the four level case, the effect of frequency ratio on the deviation characteristic is minimal. A feature of the five level (or any odd number of levels) inverter is that the midpoint node DC bus voltage does not tend to deviate significantly from the nominal value. Even though redundant state selection may eventually re-balance the capacitor voltages, the ripple on the neutral voltage is larger for $n \geq 4$. Therefore, link voltage balancing for $n \geq 4$ differs significantly from the neutral voltage drift control in three level inverters.

As discussed above, for the four level inverter at higher modulation depths, a net charge is drawn from the intermediate DC nodes 40 and 41, which eventually leads to unbalance and shutdown. The following describes an alternate method for balancing the link voltages at higher modulation depths in a four level inverter.

Figure 7:
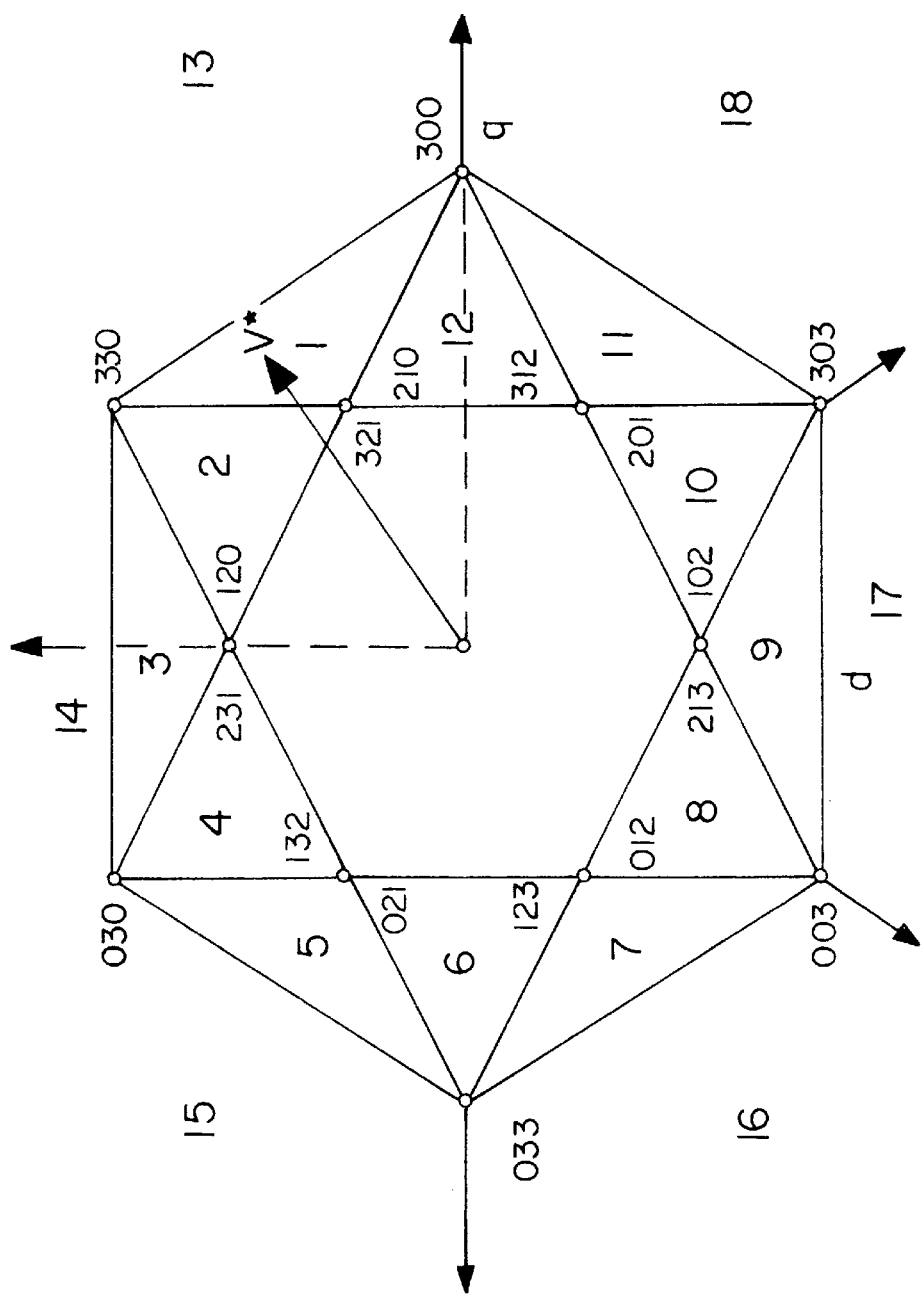
FIG. 7 is a diagram illustrating the switching states used in the modified four level space vector switching scheme in accordance with the invention.

As shown above, with increasing modulation depths, there are not sufficient redundant states available for redistributing the charges on the link capacitors. Therefore, it is evident that to improve DC bus utilization two avenues are available: (i) use only the outermost voltage vectors, i.e., states such as (300), (330), (030), (033) and (303). This is equivalent to a two level operation of the inverter and does not make use of the low voltage THD capability of the inverter; or (ii) make use of only those voltage vectors which produce appropriate capacitor currents. The latter approach is based on the observation that the innermost capacitor 37 ($C_2$) tends to discharge most rapidly, whereas the outer capacitors 36 and 38 ($C_1$ and $C_3$) charge up to half the DC bus voltage. Hence, use must be made of those switching states which can constantly regulate the $C_2$ capacitor voltage $V_{C2}$. The $S_{21}$ states are precisely those switching states which permit the transfer of charge from the outer capacitors 36 and 38 to the inner capacitor 37. $S_{30}$ states produce equal current through all capacitors. Therefore, a modulation scheme which selects only the $S_{21}$ and $S_{30}$ states would be able to improve the DC bus utilization. Appropriate triangular regions are delineated as is shown in FIG. 7. The reference voltage vector lies in one of the identified 18 regions for modulation depths $\geq 0.77$. Simulation studies indicate that conventional sine-triangle PWM schemes work satisfactorily for selected modulation depths $m_a \leq 0.7$–0.75, i.e., less than about 0.7, depending on the load conditions. The modulation depth, $m_a$, is defined as:

$$m_a = \frac{V_{ph,pk}}{V_{DC}/2} \qquad (11)$$

where $V_{ph, pk}$ is load phase peak voltage.

The voltage reference is derived from the reference modulation depth and angle as:

$$\overline{V}^*_{qds} = V^*_{qs} + jV^*_{ds} = \frac{ma^*}{2}V_{dc}\cos\theta^* + j\frac{ma^*}{2}V_{dc}\sin\theta^* \qquad (12)$$

Figure 11:
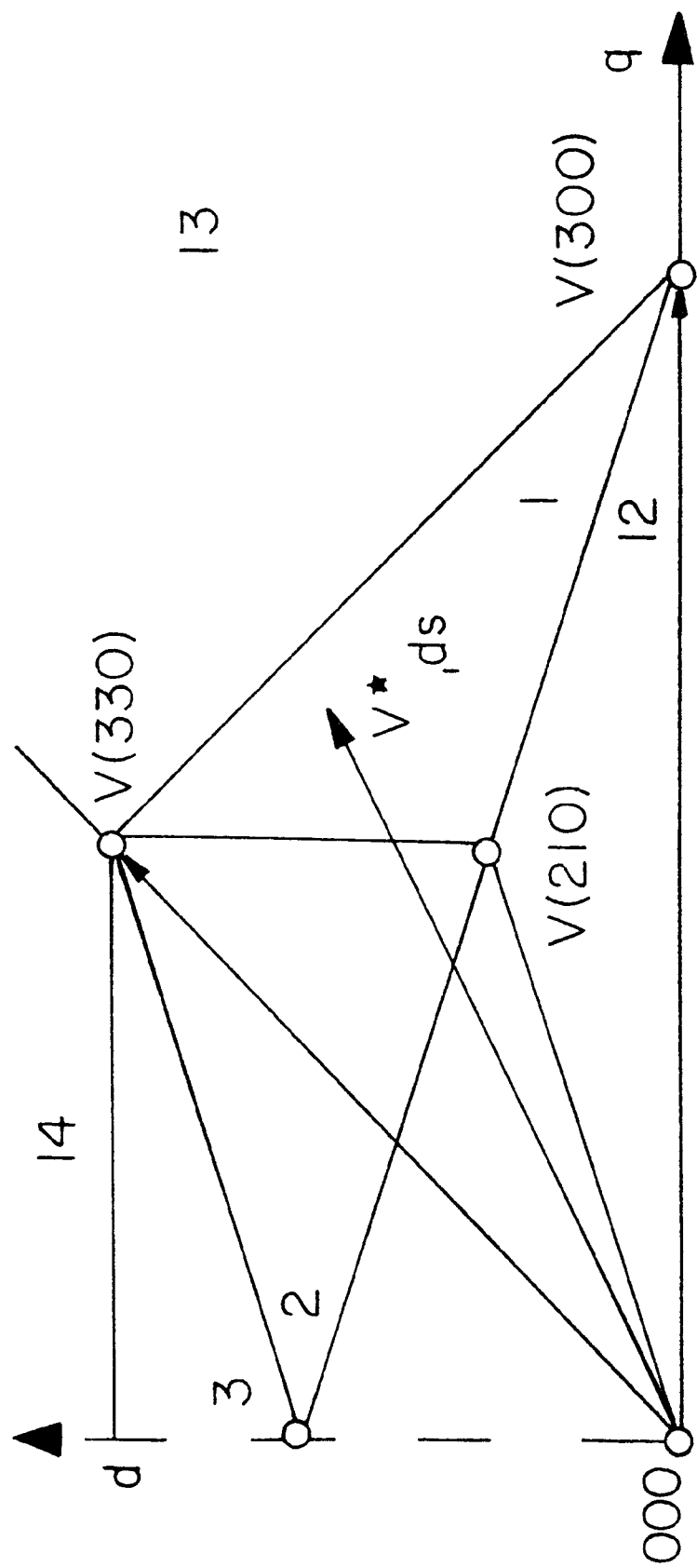
FIG. 11 is a diagram illustrating switching state selection utilizing space vector modulation in accordance with the invention.

The space vector scheme can be implemented by generating the dwell times at the voltage vectors forming the vertices of the triangle to which the voltage vector belongs as illustrated in FIG. 10. Thus:

$$\overline{V}^*_{qds} = \frac{1}{T}(t_1\overline{V}(300) + t_2\overline{V}(210) + t_3\overline{V}(330)) \qquad (13)$$

where $t_1+t_2+t_3=T$, and T=computation interval. The dwell times in this particular instance can be calculated as:

$$t_1 = T\, 1.5 m_a \cos(\theta^*) \qquad (14)$$

$$t_2 = T(3 - 2.5981 m_a \cos(\theta^* - \pi/6)) \qquad (15)$$

$$t_3 = -T(2 + 1.5 m_a \cos(\theta^* - \pi/3)) \qquad (16)$$

where $\theta^*$ is the angle made by the reference voltage vector with respect to the q-axis in the dq0 plane. The sufficient condition balancing criterion of Eq. (6) is used to determine which of the $S_{21}$ states is to be used. The duty ratios when the reference belongs to the other regions can be similarly worked out. Determining to which region the reference belongs is computationally intensive, but the overhead can be minimized for non-current regulation (vector control) schemes. Referring to FIG. 11, if $V_{qds}^*(kT)$ belongs to region 1, $V_{qds}^*((k+1)T)$ can lie either in region 1, 13, 2 or 14. This reduces the number of regions to be considered from 18 to 4. Unlike the four level PWM scheme, not all voltage vectors of the four level inverter are used. However, the primary advantage of this strategy is that the size of the triangles being small, the harmonic content of the output voltages is still low. It should be pointed out that although it is possible to create other regions (similar to FIG. 7), the shapes of such regions are either more irregular (higher THDs) or the regions do not contain states producing desirable capacitor charging currents.

Figure 12:
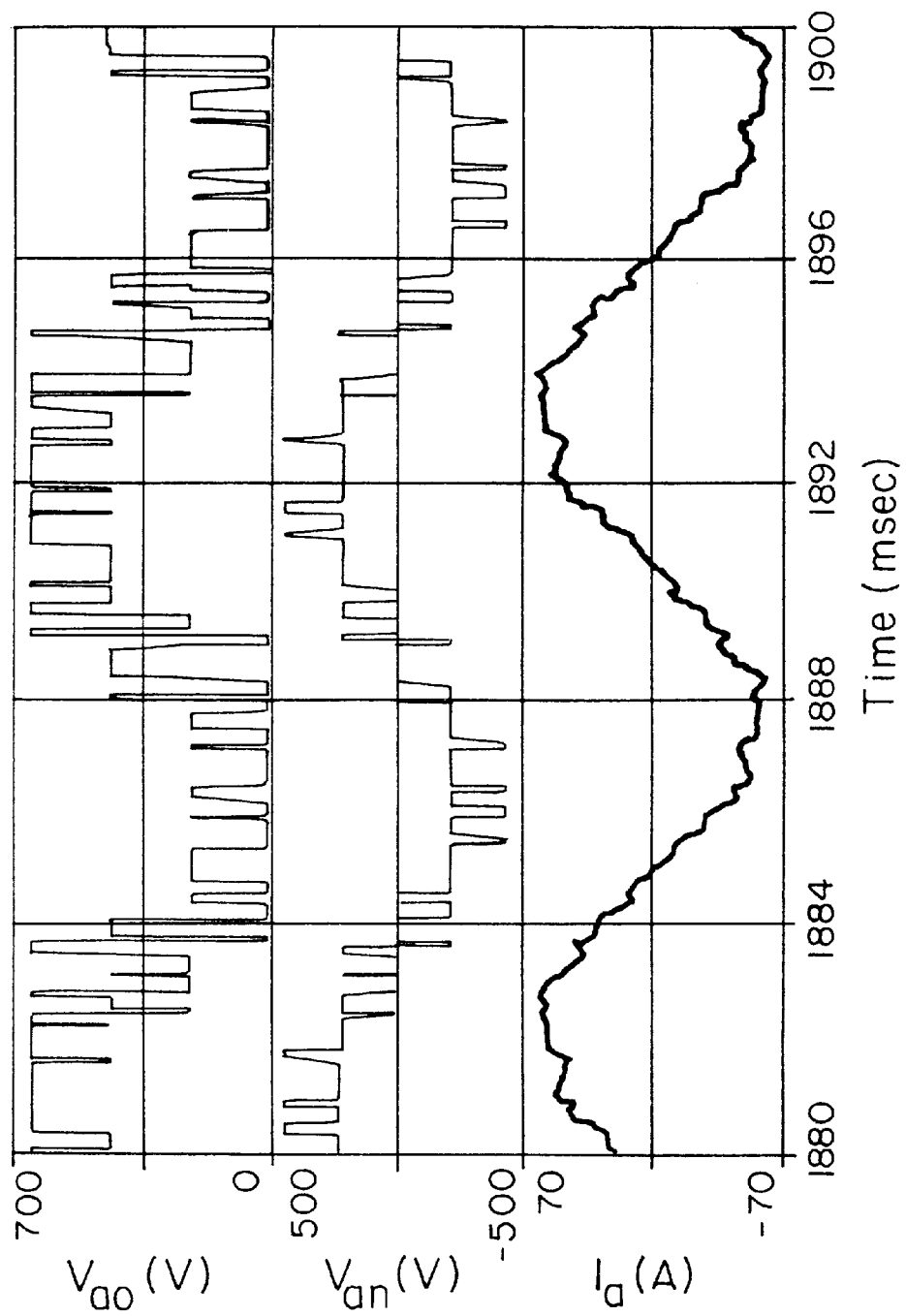
FIG. 12 are waveform diagrams for an exemplary load illustrating the inverter pole voltage, the motor phase voltage, and the phase current using the modified space vector switching scheme.
Figure 13:
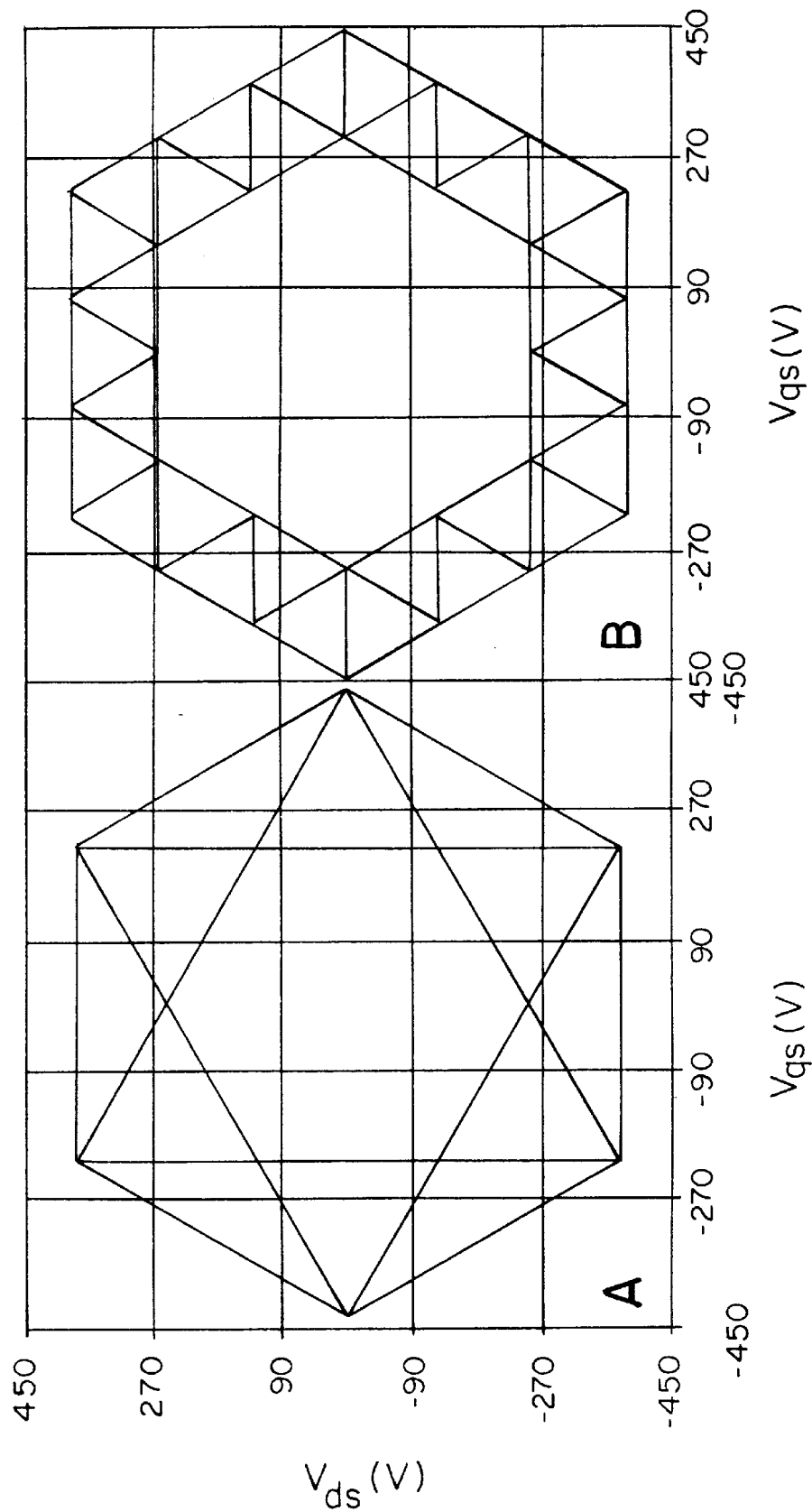
FIG. 13 are diagrams showing the dq voltage vectors selected at the same operating point by the PWM and space vector strategies.

For an example load comprising a 230 V/460 V, 8 pole 15 HP induction motor, FIG. 12 shows the inverter pole voltage $V_{ao}$, the motor phase voltage $V_{an}$, and the phase current $i_a$ for 0.5 rated torque and $f_c$=90 Hz. The computation frequency (1/T) is 720 Hz. FIG. 13 shows the dq voltage vectors selected at the same operating point by the PWM (diagram A) and the space vector (diagram B) strategies. Though the THD is degraded with space vector modulation as opposed to PWM modulation, voltage balancing cannot be effected at such high modulation depths using the latter. For $m_a$ less than a selected value, e.g., $m_a \leq 0.7$, conventional PWM is used because sufficient redundant states are available for balancing the voltages. As the commanded voltage increases, the modified space vector strategy can be invoked when the selected modulation depth value (e.g., 0.7) is exceeded or, preferably, when the voltage unbalance exceeds a pre-defined limit (typically 5%). This limit should be greater than the maximum unbalance that the PWM scheme can correct by redundant state selection. In this way, the lower THD advantages of PWM operation can be retained at higher modulation depths (e.g., $\geq 0.7$) as long as the voltage unbalance is tolerable. By ensuring that the changeover from the PWM to the space vector scheme occurs at the end of a carrier period, the resulting transients can be minimized.

At very high modulation depths (field weakening region of an induction motor), the four level space vector modulation makes a seamless transition to two level space vector modulation. The transition from space vector to a four level PWM scheme occurs when the capacitor voltage unbalances are within limits and the modulation depth falls below selected values, e.g., $m_a \leq 0.67$ (for heavy loads) and $m_a \leq 0.77$ (for light loads). This difference accounts for the variation in balancing capabilities of the inverter with load power factor. Reverting to four level PWM once the DC voltages are rebalanced by space vector modulation, though possible, is not desirable at heavy loads since the link voltages are promptly driven back into unbalance.

The spectral performance is intermediate between the conventional two level inverter and the four level inverter PWM. FIG. 8 illustrates the motor phase current spectrum under 4 level PWM, space vector modulation, and with conventional two level PWM. In every case, the modulation depth was adjusted to yield a constant fundamental voltage of 230 V at 90 Hz. The computation step size was selected to yield approximately the same average switching frequency as in the two level inverter case.

Figure 14:
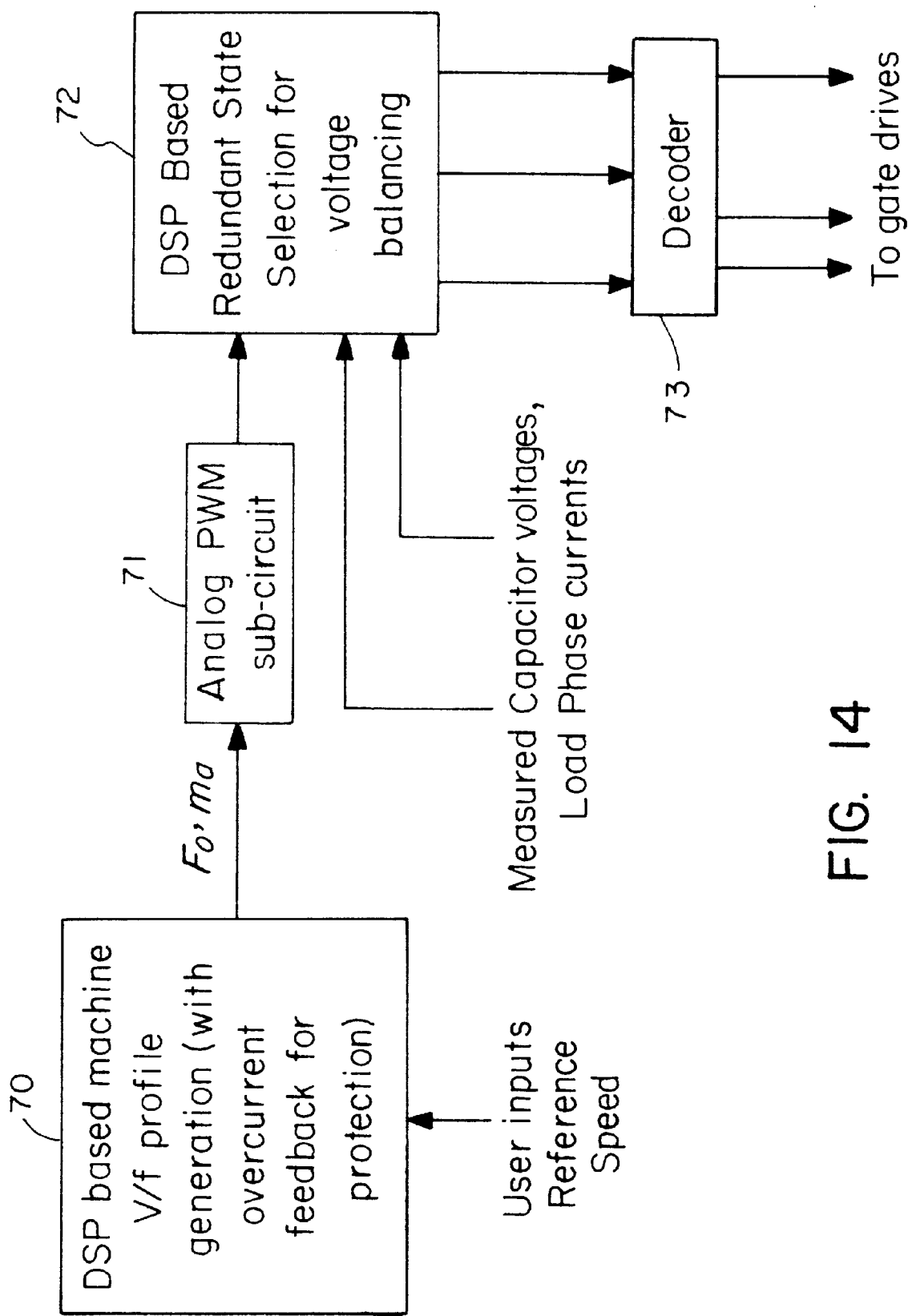
FIG. 14 is a block diagram showing the implementation of the controller for the inverter system in accordance with the invention.

A block diagram of an exemplary control system for controlling the gate signals to the switching devices of the inverter 45 is illustrated in FIG. 14. User inputs and references and speed feedback are provided to a DSP based control block 70 which provides command signals to an analog PWM subcircuit 71. The output of the subcircuit 71 is provided to a DSP based redundant state selector. This selector receives the measured capacitor voltages and load phase currents and provides output signals to a decoder 73 which generates the gate drive signals that are provided to the gates of the switching devices 60.

Figure 15:
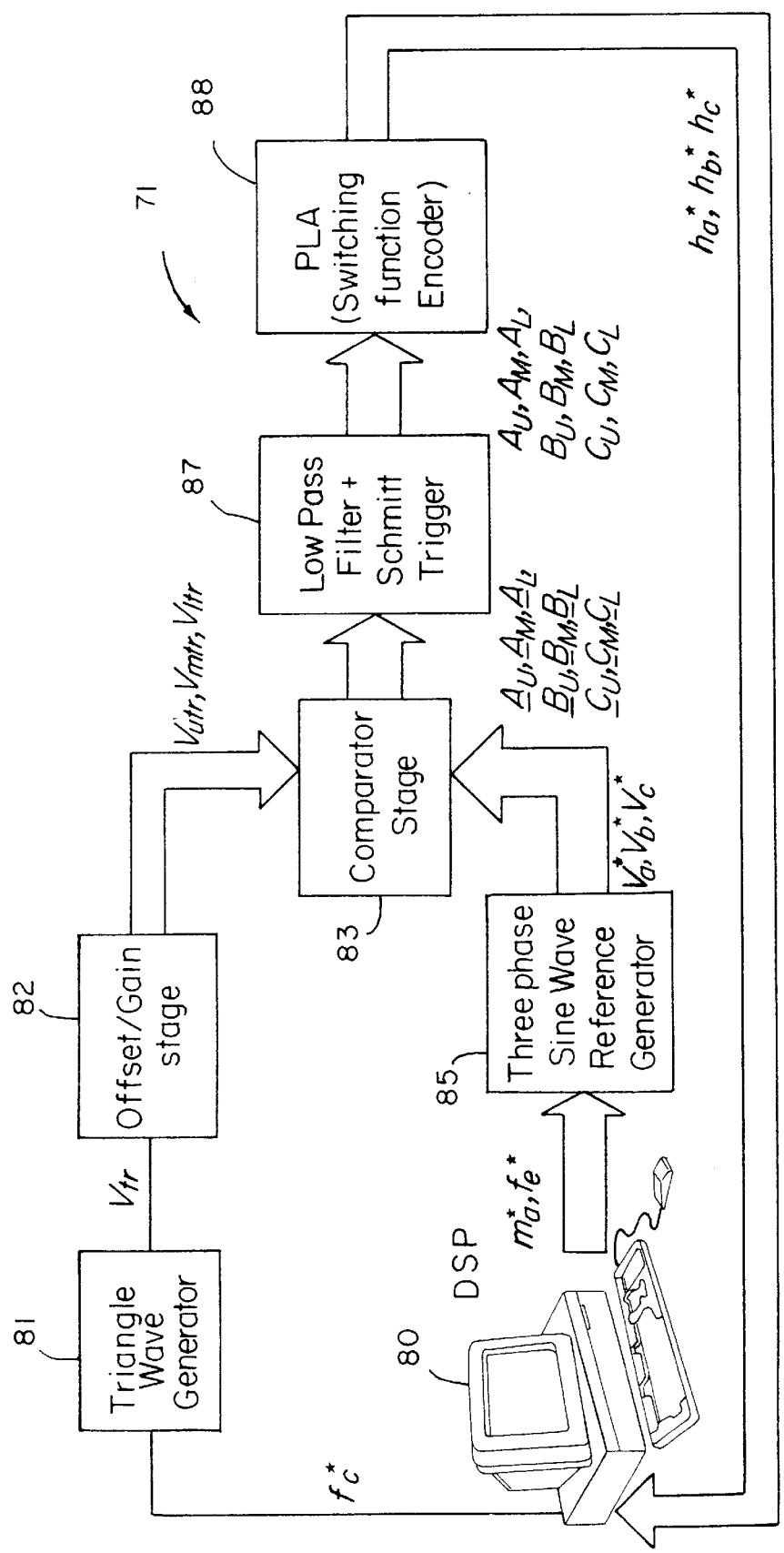
FIG. 15 is a block diagram illustrating the PWM analog sub-circuit block for the controller of FIG. 14.
Figure 16:
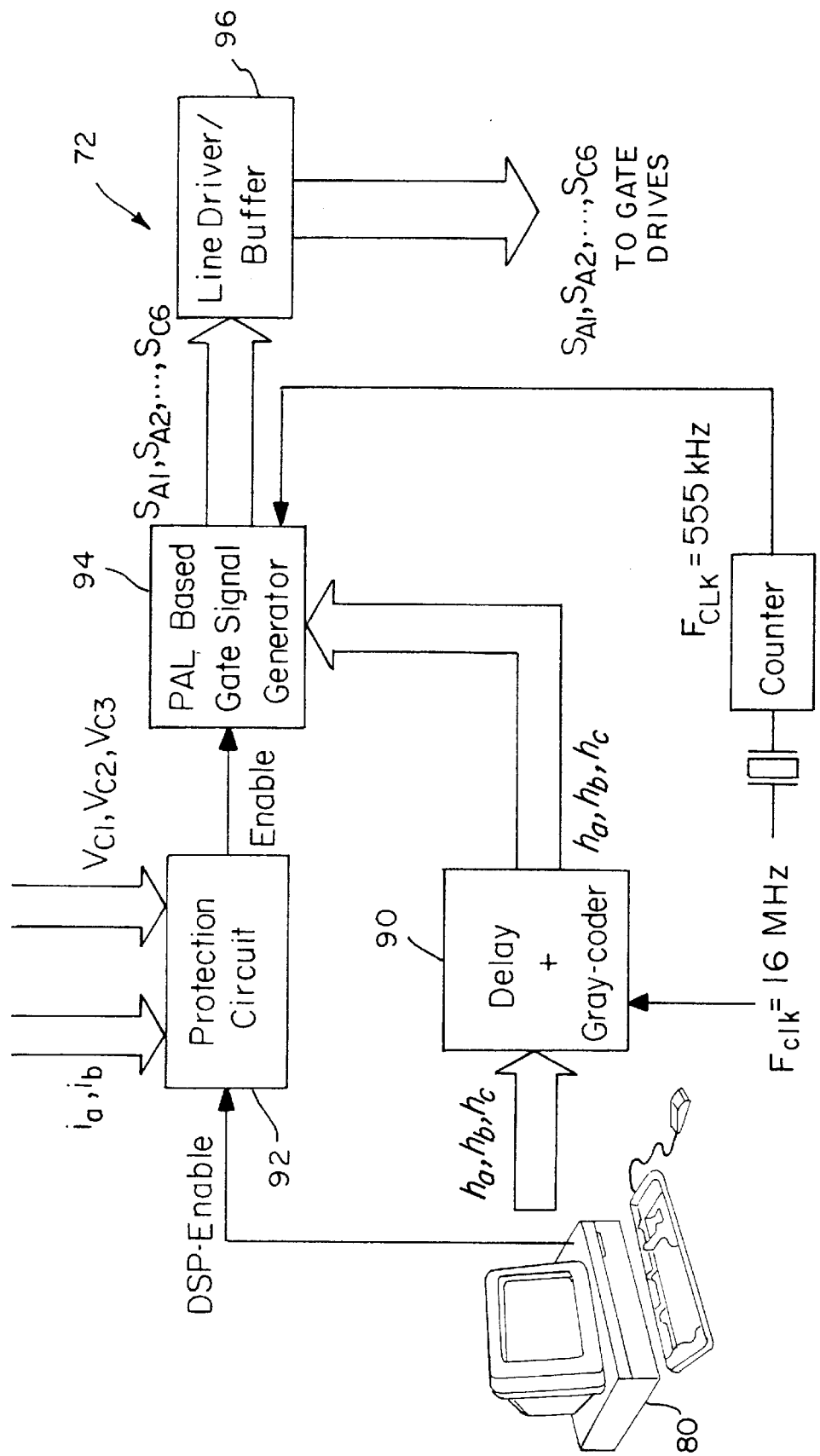
FIG. 16 is a more detailed block diagram illustrating the gate signal generation (decoder) sub-circuit of the controller of FIG. 14.

FIG. 15 is a block diagram of the analog PWM subcircuit 71. A digital signal processing computer 80 may be used to implement the block 70 for V/F profile generation as well as the redundant state selection for voltage balancing 72. The reference frequency is provided to a triangle wave generator 81 which provides its output signal to an offset/gain stage 82, the output of which is supplied to a comparator stage 83. The DSP computer system 80 also provides output commands for modulation depth and output voltage frequency to a three-phase sine wave reference generator 85, the output of which is supplied to the comparator stage 83. The output of the comparator is supplied to a low-pass filter and Schmitt trigger circuit 87, which provides its output to a programmable logic array (PLA) switching function encoder circuit 88. The output signals from the encoder 88 are provided back to the DSP system 80 which utilizes the signals as shown in FIG. 16 to provide command signals to a delay and gray-coder circuit 90, which also receives the high frequency clock signal. A DSP-enable signal is provided from the DSP computer system 80 to a protection circuit 92 which provides an enable output to a programmable array logic based gate signal generator 94, which also receives output signals from the delay and gray-coder circuit 90. The output of the gate signal generator 94 is provided to a line driver/buffer circuit 96 which generates the output control signals to the gate drives.

Figure 17:
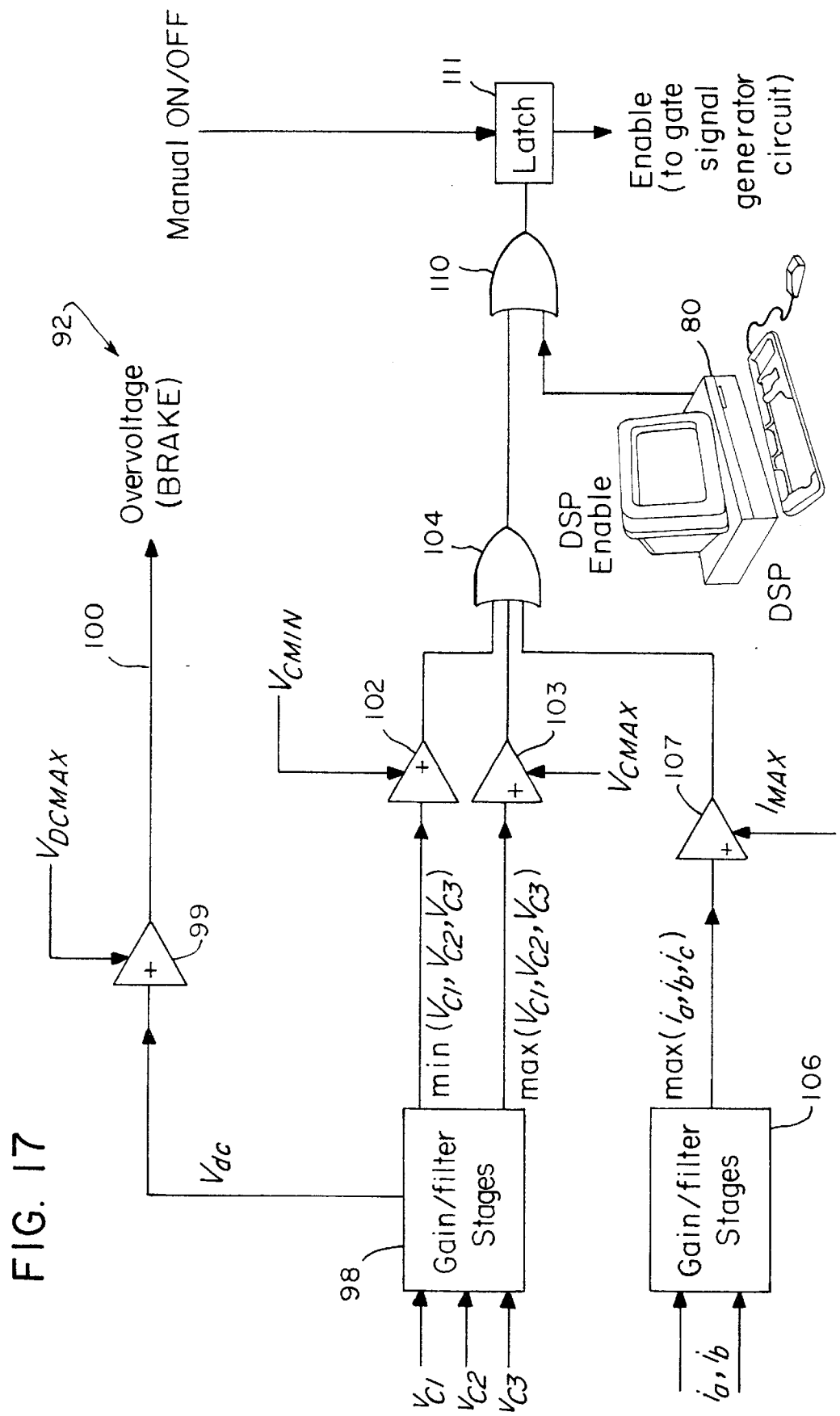
FIG. 17 is a more detailed block diagram of the protection circuit block shown in FIG. 16.

FIG. 17 is a block diagram illustrating the protection circuit 92. The protection circuit receives the capacitor voltages at gain/filter stages 98 which provides an output signal $V_{DC}$ to a comparator 99 that compares $V_{DC}$ to a maximum voltage reference $V_{DCMAX}$, and puts out an over voltage trigger signal on a line 100. This signal may be supplied to the gate of the switch 59 illustrated in FIG. 2 to provide braking action when an overvoltage of all capacitor voltages is detected. The gain/filter stages 98 also provide a minimum and maximum signals, representing the minimum and maximum of the voltages on the capacitors, to a voltage minimum comparator 102 and a voltage maximum comparator 103, the outputs of which are provided to an OR gate 104. A set of gain/filter stages 106 also receives the phase currents $I_a$ and $I_b$ and provides an output signal corresponding to the maximum value of the phase currents to a comparator 107 which compares that signal to a current maximum signal $I_{max}$. The output of the comparator 107 is also provided to the OR gate 104. The output of the OR gate 104 will thus go high when any one of the comparators 102, 103 or 107 goes high. The output of the OR gate 104 is provided to another OR gate 110 which also receives a DSP enable signal from the DSP computer system 80. The output of the OR gate 110 is provided to a latch 111 which receives as its input a manual on/off signal and provides an enable signal at its output to the gate signal generator 94 when no over—or under—voltages or over-currents are present.

Figure 18:
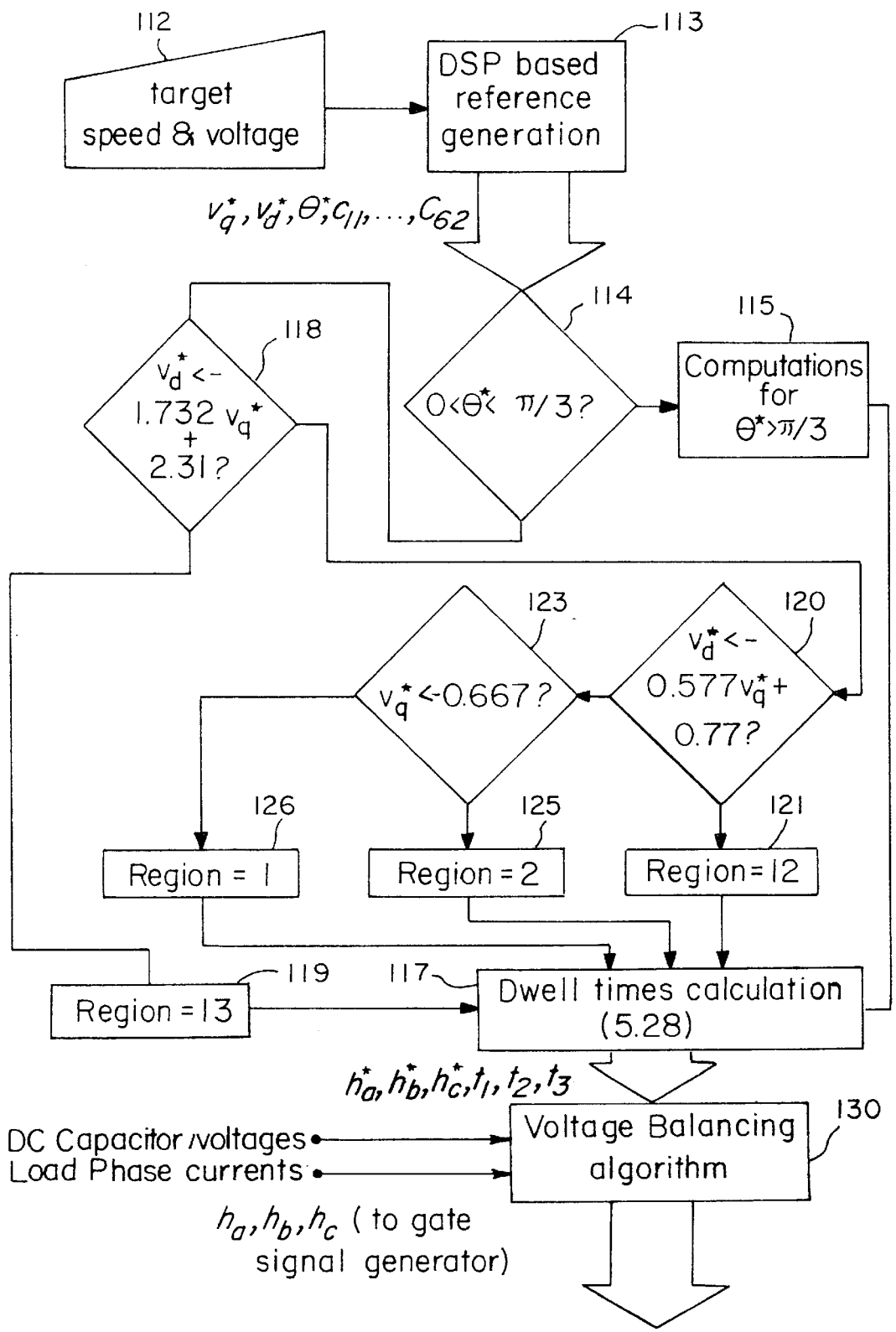
FIG. 18 is a part of the flow diagram illustrating the way in which region detection is carried out by the controller in space vector modulation.

FIG. 18 is a flow diagram showing the operation of the DSP computer system 80 which carries out region detection in space vector modulation. As illustrated in FIG. 18, the target speed and voltage are provided at 112 to DSP based reference generators 113. A comparison is made to determine whether the angle $\theta^*$ is between 0 and $\pi/3$ at 114; if not, computations are made for $\theta^* \geq \pi/3$ at 115 which are provided for dwell time calculations at 117. If the angle is within range at 114, a comparison is made for values of $V_d^*$ at 118 to determine if a first value is reached which indicates region number 13 (block 119), which information is provided to the dwell times calculation 117. Otherwise comparisons are made at 120 for $V_d$ to determine if operation is in region 12 (block 121), and if not, to determine at 123 whether operation is in region 2 (block 125), or region 1 (block 126), which determinations are again provided to the dwell time calculations 117. The output of the dwell time calculation 117 is provided to the voltage balancing algorithm at 130, which provides output signals to the gate signal generator.

In the implementation of FIG. 18, the voltage reference is derived from the reference modulation depth and angle as:

$$\overline{V}_{qds}^* = V_{qs}^* + jV_{ds}^* = \frac{m_a^*}{2} V_{dc} \sin\theta \qquad (17)$$

For $m_a^* < 0.77$, sine-triangle PWM or two level space vector modulation can be used to switch the inverter. For $0.77 < m_a^* < 1.155$, the reference voltage vector can belong to one of the twelve triangular regions shown in FIG. 7.

Figure 19:
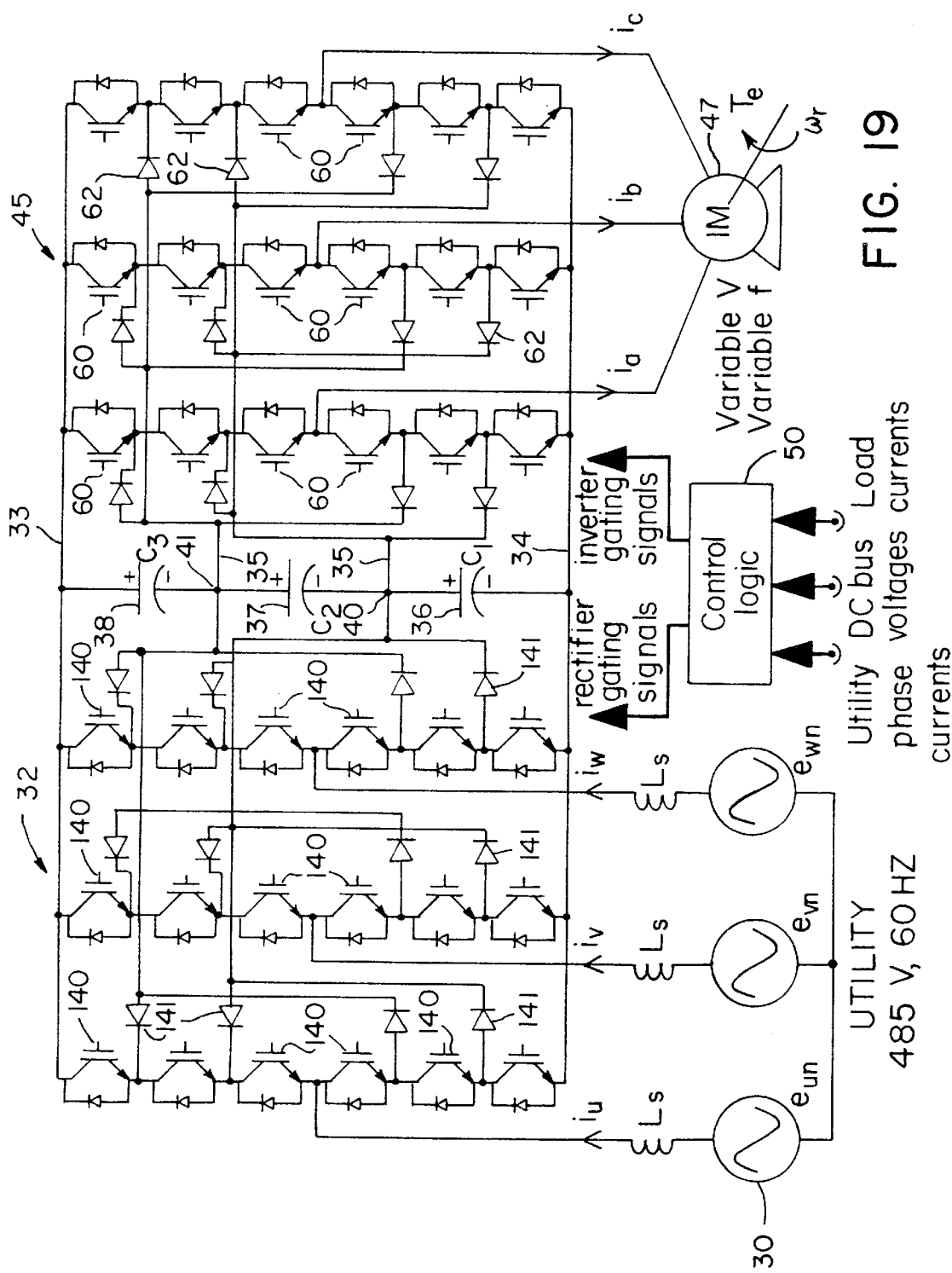
FIG. 19 is a schematic circuit diagram showing a four level rectifier-inverter drive system having an active rectifier in accordance with the invention.

The reference voltage vector lies in one of the regions 13–18 of FIG. 7 for $m_a^* < 1.155$, which corresponds to over-modulation even for a conventional voltage source inverter. As with two level space vector Nearest Three Vector switching, space vector modulation is implemented by calculating the dwell times at the voltage vectors forming the vertices of the triangle to which the voltage vector belongs. Thus, the dwell times are calculated at block 117 from:

$$\begin{bmatrix} V_{qs}^* \\ V_{ds}^* \\ T \end{bmatrix} = \begin{bmatrix} V_g(300) & V_g(330) & V_g(210) \\ V_d(300) & V_d(330) & V_d(210) \\ 1 & 1 & 1 \end{bmatrix} \begin{bmatrix} t_1 \\ t_2 \\ t_3 \end{bmatrix} \qquad (18)$$

where T=averaging interval. It can be shown that if the region to which the reference voltage vector belongs is detected correctly, the solutions satisfy $0 \leq t_1, t_2, t_3 \leq 1$. Once the dwell times are computed, the switching sequence can be arranged as a linear combination of symmetric ($\alpha$) and anti-symmetric ($\beta$) sequences as shown in FIG. 19 where $\alpha+\beta=1$.

Unlike the conventional space vector modulation, the zero voltage vector is not common to all triangles and so the switching frequency cannot be minimized to the same extent as with a two level space vector modulation and the harmonic currents are higher. Of the redundant states (2,1,0) and (3,2,1), that state is selected that will produce appropriate charging currents to balance the capacitor voltages.

The coefficient matrix for the dwell times calculation at 117 is dependent on the DC bus voltage, and preferably only normalized values of the reference voltage and coefficient matrix are used. This can lead to errors in the voltage command that can, however, be removed by a closed loop regulator. Determination of the region to which the reference voltage vector belongs is computationally intensive. Both angle and magnitude sensitive computations are required to make a precise determination of the region. For instance, in FIG. 18, part of the flow diagram for detecting the region to which the reference belongs is shown. The constants $C_{11}, \ldots, C_{62}$ for the reference generation at 113 are derived from the shape of the hexagons of the four level inverter. Also, normalized values of the reference voltages are used.

In addition to the problem of balancing the DC link capacitor voltages, an additional concern with high power drive systems is the harmonic current injection into the utility power system. Because of regulatory standards (e.g., IEEE-519) which potentially penalize the use of equipment that degrades the power system quality, a desirable feature for multilevel drives is an ability to regulate the input currents and thereby reduce harmonic current injection.

For the four-level (or higher level) inverter based drives in accordance with the present invention, an active rectifier 32 may be utilized, an example of which is illustrated in FIG. 19. The active rectifier utilizes switching devices 140 (e.g., IGBTs) which may be connected in the neutral clamped inverter topology (similar to the inverter 45) by diodes 141 connected to the intermediate nodes 40 and 41 between the series capacitors 36, 37 and 38. In this configuration, the controller 50 also provides output gating signals to the gates of the switching devices 140. The neutral point clamped rectifier 32 has the same switching states as shown in FIG. 4 for the inverter 45. A four level rectifier of this type can both regulate the utility input currents (thereby reducing distortion) and concurrently balance the DC link capacitor voltages. The inverter modulation may then, if desired, be relatively unconstrained and can be optimized for a particular drive application.

Rectifier current regulation consists of two stages: (i) reference current generation, and (ii) scheduling of rectifier switching events.

The phase current reference can be derived as:

$$i_u^* = I_m \cos(\omega_e t), \quad i_v^* = I_m \cos(\omega_e t - 2\pi/3), \quad i_w^* = I_m \cos(\omega_e t + 2\pi/3) \quad (19)$$

where the utility phase voltages are:

$$e_{un} = E_m \cos(\omega_e t), e_{vn} = E_m \cos(\omega_e t - 2\pi/3), e_{wn} = E_m \cos(\omega_e t + 2\pi/3) \quad (20)$$

and $\omega_e = 2\pi f$ where f is the utility frequency=60 Hz. The reference current phase magnitude ($I_m$) is obtained as a sum of two quantities: (i) the PI (proportional integral) regulation of each capacitor voltage and (ii) the load feedforward term. Therefore:

$$I_m = I_{m1} + I_{m2},$$

where the DC bus regulation term is derived as:

$$I_{m1} = \sum_{j=1}^{3} \alpha_i \left( k_p (V_{Cj} - V_{DC,ref}/3) + k_i \int_0^t (V_{Cj}(x) - V_{DC,ref}/3) dx \right) \quad (21)$$

$k_p$, $k_i$ are the proportional and integral control constants, and $\alpha_i$ are biasing constants. The load feedforward component is obtained by filtering the inverter output power so that the transient response is improved.

$$I_{m2} = k_{lff} \tilde{P}_{inv,out} \text{ and } \tilde{P}_{inv,out} = L^{-1} \left\{ \frac{P_{inv,out}(s)}{1 + s\tau_{lff}} \right\} \quad (22)$$

Where "$L^{-1}$" is the inverse Laplace transform operation.

Regulating the utility currents determines which of the 37 voltage vectors of FIG. 4 the rectifier should select. The criterion for selecting a voltage vector is that the angle between the regulating voltage $\Delta V = E_{qds} - V_{rect}$ and the current error vector $\Delta I_{qds}$ should be greater than 90°. However, the rectifier should select a switching state (from among the 64) that will balance the link capacitor voltages. Switching states of the rectifier differ a great deal in their properties. $S_{10}$ states produce capacitor currents in one capacitor only; $S_{21}$ states produce currents of opposite polarity through the inner and one outer capacitor; $S_{20}$ and $S_{30}$ states produce equal currents through two and three capacitors, respectively, and $S_{31}$ and $S_{32}$ states produce equal currents through two capacitors while the current through the third capacitor has the opposite polarity. The ability of the set of switching states to regulate the input currents varies with the magnitude of the voltages they produce. Therefore, finding a single switching state to concurrently achieve both goals is theoretically not guaranteed and, when possible, is very computationally intensive. The control is simplified by categorizing rectifier switching events into two types: (i) voltage balancing priority switching, and (ii) utility current regulation priority switching.

Figure 20:
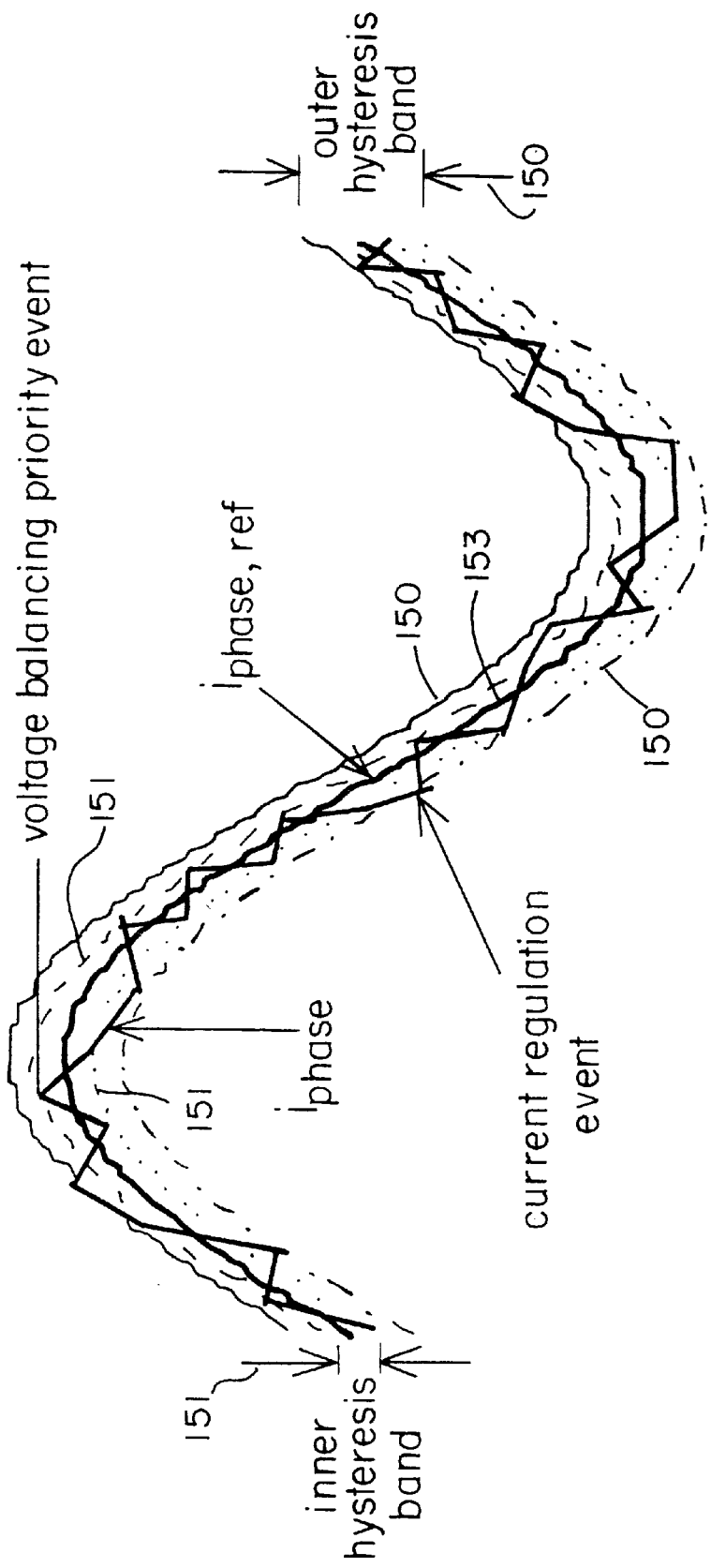
FIG. 20 is an illustrative diagram illustrating a modified hysteresis band switching scheme for the active rectifier of FIG. 19.
Figure 21:
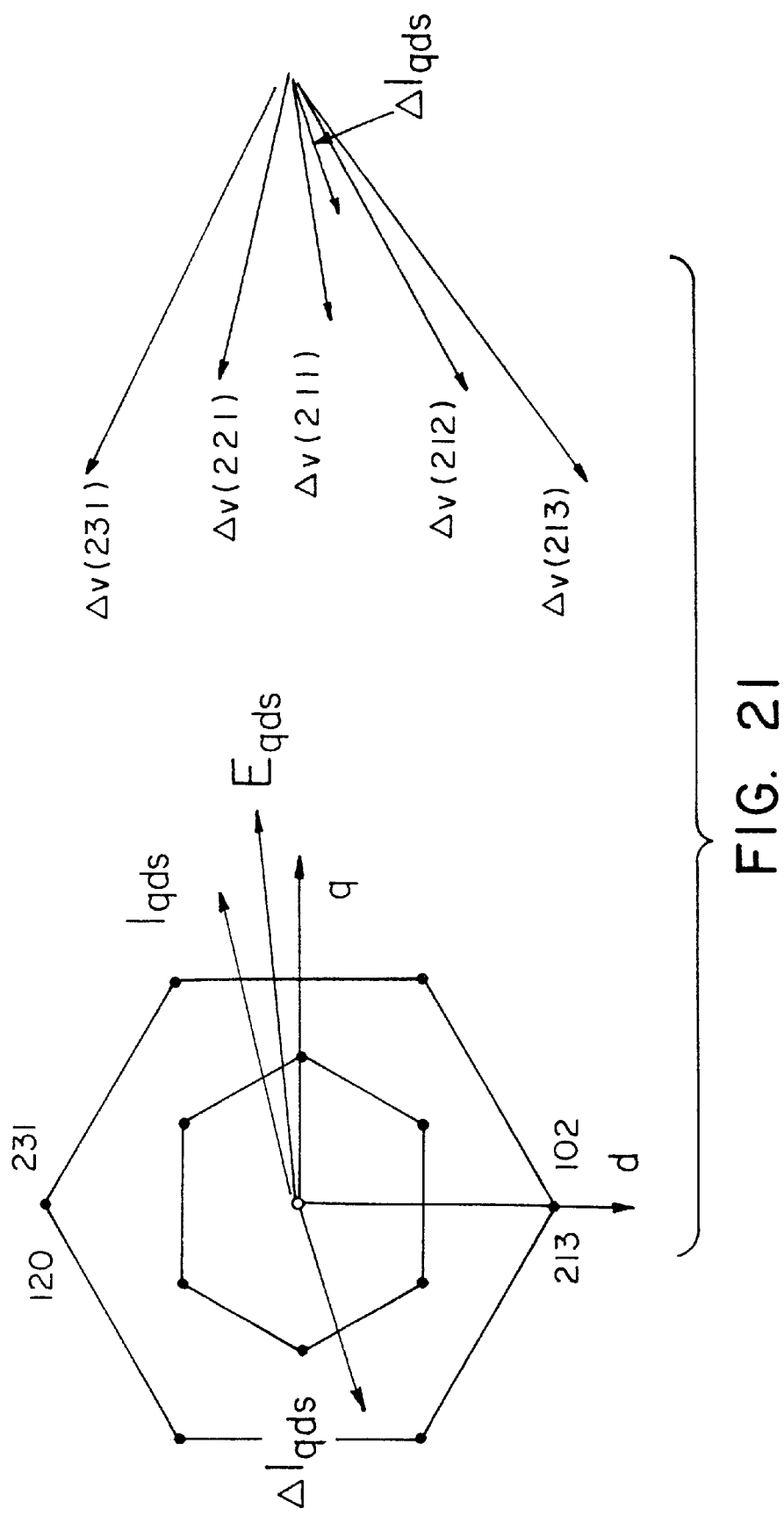
FIG. 21 are diagrams illustrating the voltage balancing priority switching events for the rectifier of FIG. 19.

The control is based on the principle that when the utility current errors are small, the rectifier should select those states that tend to balance the link voltages, and when the current errors become large, those switching states are selected which will reduce the current errors. This is the basis of the "modified hysteresis" current control illustrated in FIG. 20. Thus, in a time averaged sense, both of the control objectives of the rectifier are achieved. In modified hysteresis or double hysteresis band is current regulation, two concentric bands 150 and 151 are defined around each phase current reference 153. Increasing magnitude intersection of the phase currents with the inner tolerance band 151 schedules a voltage balancing priority switching event during which only $S_{10}$ and $S_{21}$ states are considered. This is because $S_{10}$ states enable a very selective charging/discharging of one particular capacitor whereas $S_{21}$ states permit charge to be transferred from an outer to an inner capacitor. (Under normal operating conditions, the inverter operates at a lagging power factor, which selectively discharges the innermost capacitor.) For example, if $i_u > 0$, $i_v < 0$, $i_w < 0$ and $\Delta V_{C1} \geq 0$, $\Delta V_{C2} \leq 0$, $\Delta V_{C3} \geq 0$ with the $E_{qds}$, $\Delta I_{qds}$ and $I_{qds}$ vectors as shown in FIG. 21, the regulating voltages for those $S_{21}$ and $S_{10}$ states are shown which balance the link voltages. In this case state (211) is selected if $|\Delta V_{C2}| \geq |\Delta V_{C1}|, |\Delta V_{C3}|$.

Figure 22:
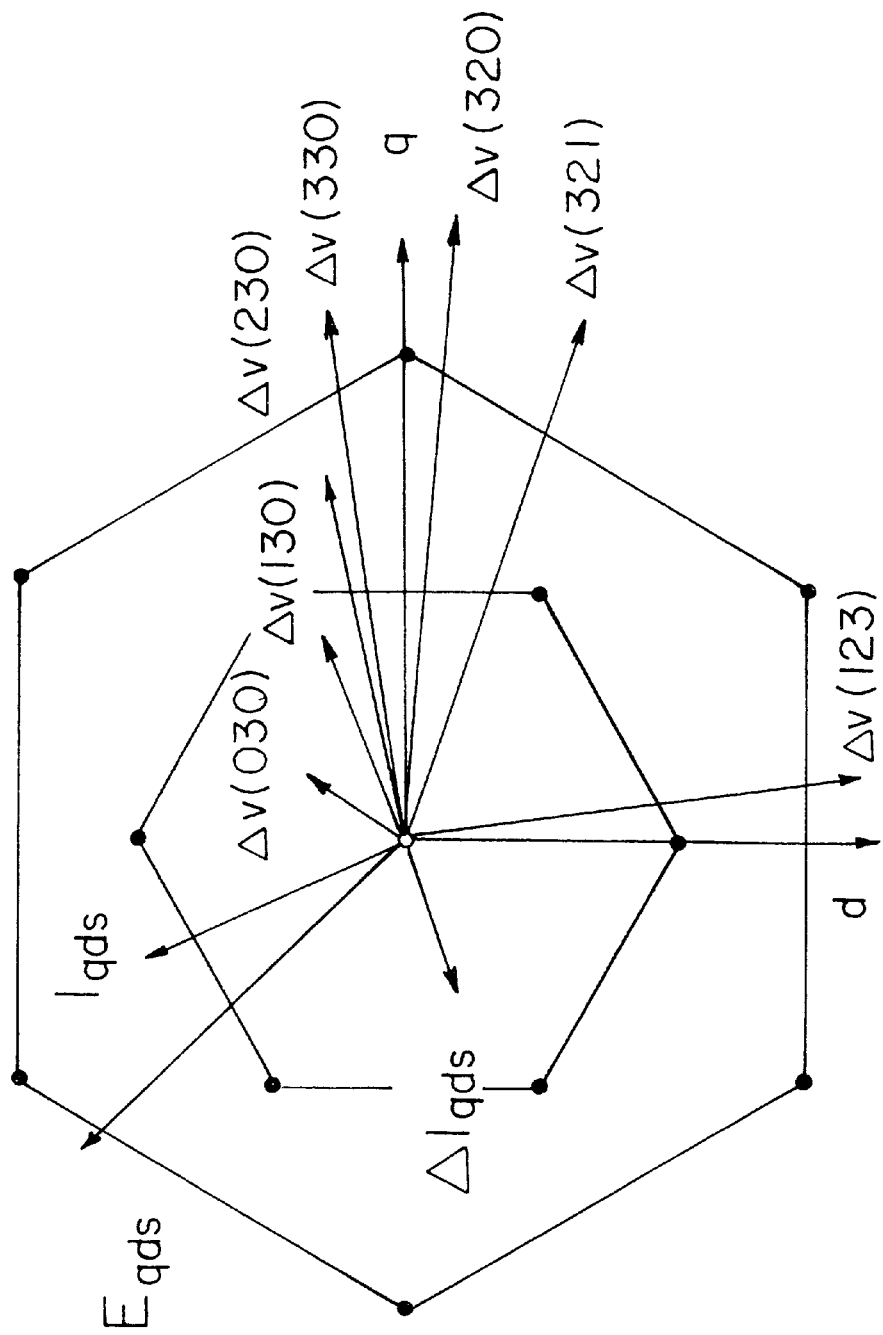
FIG. 22 is a diagram illustrating the current regulation priority switching events for the rectifier of FIG. 19.

Since the angle between the vector V(211) and $E_{qds}$ is less than 90°, the current error will grow; however, when the current error becomes greater than the magnitude of the outer tolerance band 150, a current regulation priority switching event is scheduled. In this case, $S_{21}$ states and $S_{30}$ states are selected which will regulate the current. For example, for the locations of $\Delta I_{qds}$, $I_{qds}$ and $E_{qds}$ shown in FIG. 22, any of the following $S_{30}$ or $S_{21}$ states could be selected: (030), (130), (230), (320), (321) and (123). However, state (030) is selected because it produces a positive current through $C_2$ for which $\Delta V_{C2}$ was $\leq 0$ in addition to regulating the current fastest.

Figure 23:
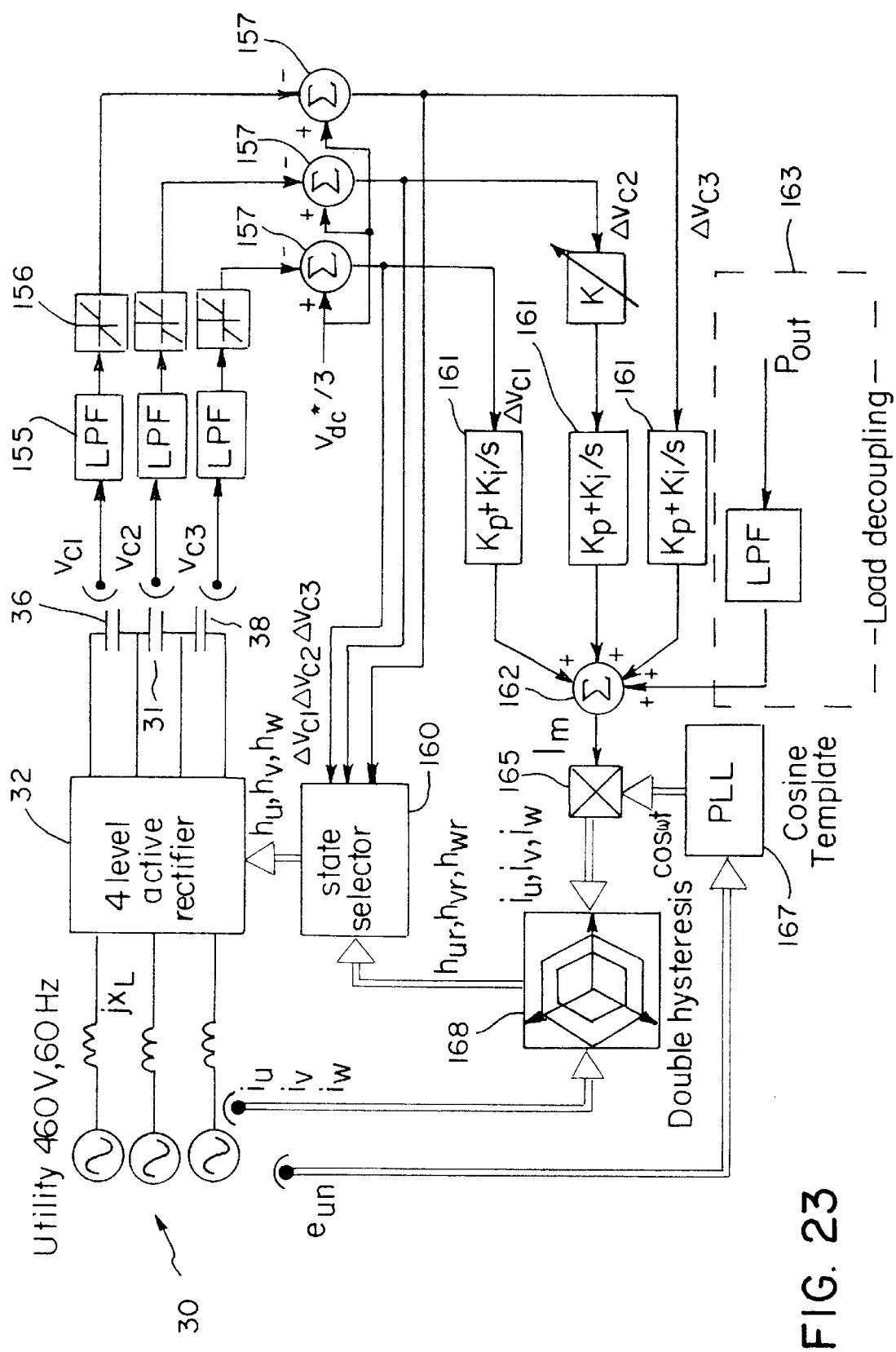
FIG. 23 is a block diagram illustrating the implementation of the controller for the controlling of the switching devices of the active rectifier of FIG. 19.

The inverter performs a redundant state selection whenever the inverter modulation permits it. Link voltage balancing, however, is not affected when the inverter is saturated. Also, complete bidirectional-real power flow is possible. A block diagram showing the implementation of the rectifier control is shown in FIG. 23. The voltages across the DC bus capacitors 36, 37 and 38, $V_{C1}$, $V_{C2}$, and $V_{C3}$, are provided to a bank of low pass filters 155, the outputs of which are passed through deadband circuits 156 before being applied to summing junctions 157. The summing junctions 157 also receive the target voltage value for the capacitors, $V_{DC}^*/3$, and the difference between the target voltage and the measured voltage from the output of the summing junctions 157 is provided to a state selector 160. The outputs of the summers 157 are also provided through proportional-integral blocks 161 to a summer 162 which also receives a low pass filtered power output signal from a circuit 163. The output of the summing junction 162, $I_m$, is provided to a multiplying junction 165. The other input to the multiplying junction 165 is provided from a phase locked loop 167 that is locked to the utility power system voltage waveform. The output of the multiplying junction 165 is provided to a double hysteresis circuit 170 which also receives signals corresponding to the three input phase currents $I_u$, $I_v$ and $I_w$. The output of the double hysteresis circuit 178 is also provided to the state selector 160. The state selector 160 thus uses the information from the double hysteresis circuit 178 and the differentials from the junctions 157 to provide the gating signals $H_u$, $H_v$ and $H_w$ to the active devices within the rectifier 32.

Figure 24:
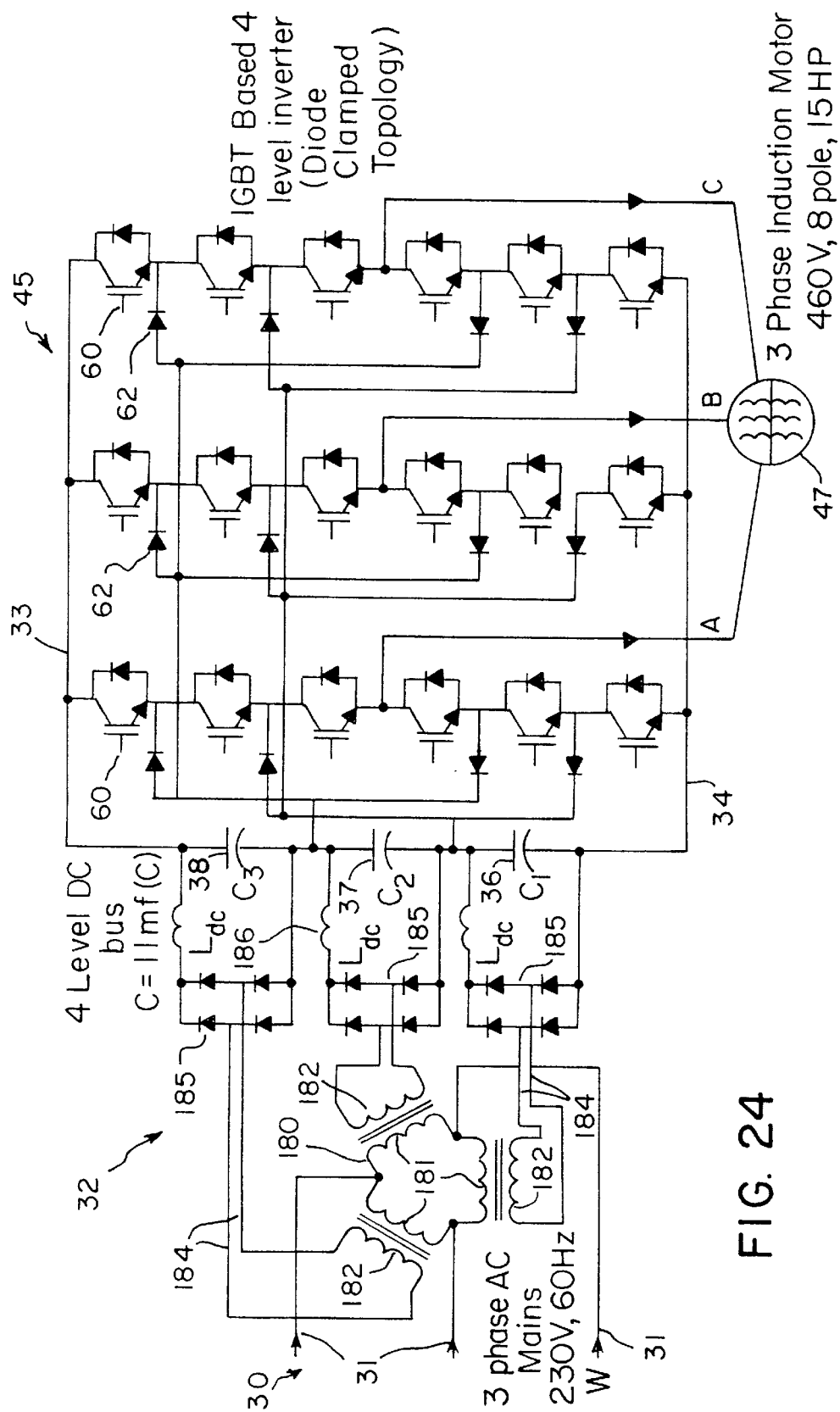
FIG. 24 is a schematic diagram of an inverter drive system utilizing an input transformer having a three-phase primary and three single-phase secondaries connected to separate rectifiers for each DC bus capacitor.

In addition to the utilization of a passive rectifier as shown in FIG. 2 or an active rectifier as shown in FIG. 19, both of which are directly connected between the source 30 and the DC link capacitors 36, 37 and 38, the rectifiers may incorporate transformers at the input for isolation or a change in voltage level. An example is shown in FIG. 24, in which an isolation transformer 180 is connected to the three-phase input lines 31 from the source 30, with the phase voltages on the lines 31 being supplied to a three-phase primary 181 of the transformer 180. Transformer 180 has three single phase secondaries 182, each one of which is coupled to one of the phase windings of the primary 181. The single phase output of the secondary windings 182 is provided on lines 184 to single phase rectifier bridges 185 composed of four diodes. Linking reactors 186 are connected in the output from the rectifier bridges 185 to prevent excessive regulation in the DC voltages applied across the capacitors 36, 37 and 38 as the load currents change. The primary to secondary turns ratios may be selected to provide a desired equal DC voltage level across each of the capacitors 36, 37 and 38. Because each of the capacitors is separately supplied with DC voltage from the three rectifiers, the voltages across the capacitors will inherently tend to be balanced. Any unbalance caused by unbalances in the phase currents from the source 30 or due to unequal power drawn from the capacitors may be compensated for utilizing the appropriate switching of the active devices of the inverter 45 as discussed above to rebalance the capacitor voltages.

Figure 25:
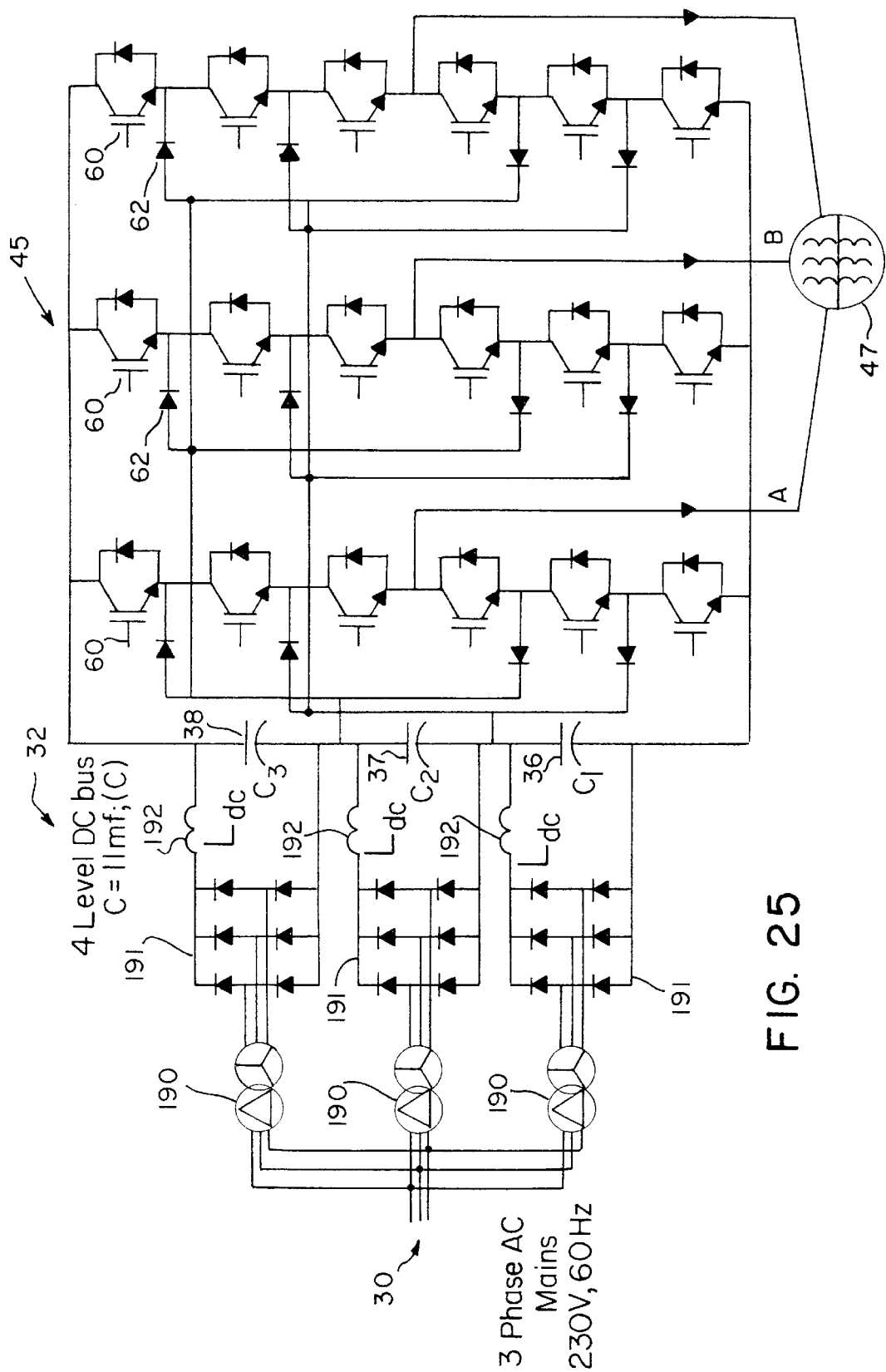
FIG. 25 is a circuit schematic diagram for an inverter drive system in accordance with the invention having three separate three-phase input transformers connected to the main three-phase AC power system, and connected to supply power to three separate three-phase rectifiers which individually supply voltage to the DC bus capacitors.

An alternative configuration, which is particularly suited to high power applications, is shown in FIG. 25, in which 3 three-phase transformers 190 have their primaries connected in parallel to the input lines 31. The three-phase outputs of the secondaries of each of the three-phase transformers 190 are provided to three-phase diode bridges 191. The output of the bridges is provided across one each of the capacitors 36, 37 and 38, and linking reactors 192 may be connected in the output from the rectifiers 191 as discussed above. Again, any imbalances in the voltages across the capacitors 36, 37 and 38 may be compensated for by appropriate control of the switching states of the inverter switching devices 60. The implementation of FIG. 25 is not limited to three-phase input power and may be extended to five level and higher level inverters. The number of transformers 191 required will be equal to the number of capacitors in the DC bus, e.g., four transformers for a five level inverter. Nonetheless, by utilization of the diode clamped inverter topology for the inverter 45, the cost of such a drive is still lower than drives which utilize cascaded H-bridges to implement multilevel inverters. In general, the transformer supplying power to the center capacitor 37 in the four level inverter topology (or the single phase secondary for the transformer 180 of FIG. 24) may require a is higher current rating and be thermally oversized as compared to the other transformers (or single phase secondaries).

It is understood that the invention is not limited to the particular embodiments set forth herein as illustrative, but embraces all such modified forms thereof as come within the scope of the following claims.

What is claimed is:

1. A multilevel inverter system comprising:
    (a) three DC bus capacitors connected in series at nodes between the capacitors and with the series connected capacitors connected across DC bus lines;
    (b) an inverter connected to the DC bus lines and to the nodes between the capacitors to be supplied with the voltages therefrom, the inverter comprised of a plurality of controlled switching devices connected in a configuration to provide three-phase power on three output lines and at four voltage levels on each output line;
    (c) control means connected to the switching devices of the inverter to control the switching of the same; the control means controlling the switching of the switching devices to provide a selected output voltage waveform at the output lines; and
    (d) a transformer having a three-phase primary coupled to three separate single-phase secondaries, the primary connected to receive three-phase power at AC input lines, and a single-phase bridge rectifier connected to each secondary to provide the rectified power therefrom across one of the DC bus capacitors.

2. A multilevel inverter system comprising:
    (a) three DC bus capacitors connected in series at nodes between the capacitors and with the series connected capacitors connected across high and low DC bus lines;
    (b) an inverter connected to the high and low DC bus lines and to DC bus lines connected to the nodes between the capacitors to be supplied with the voltages therefrom, the inverter comprised of a plurality of controlled switching devices connected in a configuration having redundant switching states to provide three-phase power on three output load lines and at four voltage levels on each output line; and
    (c) control means receiving signals indicative of the voltages across the DC bus capacitors and load currents on the output lines and connected to the switching devices of the inverter to control the switching of the same, the control means using the signals indicative of the voltages and currents at each switching event for controlling the switching of the switching devices to provide a selected output voltage waveform at the output lines utilizing redundant switching states when such states are available to select one of the available redundant switching states that serves to provide the desired phase-to-phase voltages and to tend to equalize the voltages across the DC bus capacitors, wherein the control means determines which switching state to utilize of the available switching states by evaluating the quantity $Q=\Delta V_{C1}I_1+\Delta V_{C2}I_2+\Delta V_{C3}I_3$ for each available switching state and selecting one of the available redundant switching states for which the quantity Q is $\geq 0$, wherein $\Delta V_{C1}$, $\Delta V_{C2}$, and $\Delta V_{C3}$ are the respective differences between the measured voltage across each capacitor and the nominal voltage across each capacitor, and $I_1$, $I_2$, and $I_3$ are currents flowing through DC bus lines to the inverter determined for the load currents and the available switching states.

3. The inverter system of claim 2 wherein the control means controls the inverter to switch the switching devices to provide a pulse-width modulated waveform of the voltage on the phase output lines.

4. The inverter system of claim 2 wherein there are three DC bus capacitors connected in series, two outer capacitors and one inner capacitor, and wherein at modulation depths at which sufficient redundant states are not available to effectively equalize all of the capacitor voltages, the control means controls the switching devices utilizing one of the available redundant states that transfers charge from the outer capacitors to the inner capacitor.

5. The inverter system of claim 2 wherein the inverter comprises the controlled switching devices and a plurality of diodes connected in a diode clamped multilevel inverter configuration.

6. The inverter system of claim 2 wherein the control means controls the switching devices to switch under sine-triangle pulse-width modulation for modulation depths $m_a$ less than a selected value and under space vector modulation for modulation depths $m_a$ greater than the selected value where $$m_a = \frac{V_{ph,pk}}{V_{DC}/2}$$

and $V_{ph,\,pk}$ is the load phase peak voltage and $V_{DC}$ is the voltage across the high and low DC bus lines.

7. The inverter system of claim 6 wherein the selected value of $m_a$ is about 0.7.

8. The inverter system of claim 2 further including a rectifier connected to the high and low DC bus lines and having AC input lines to convert AC input power at the input lines to a DC voltage at the DC bus lines.

9. The inverter system of claim 8 wherein the rectifier further is connected to the nodes between the DC bus capacitors to provide intermediate DC voltages across each capacitor.

10. The inverter system of claim 9 wherein the rectifier includes a plurality of controlled switching devices and diodes and wherein the control means is connected to the controlled switching devices to control the same, the switching devices and diodes connected in the rectifier in a diode-clamped rectifier configuration and wherein the control means provides control signals to the switching devices to switch the switching devices to provide selected DC voltages across the DC bus capacitors.

11. The inverter system of claim 10 wherein the rectifier switching devices are switched in accordance with a hysteresis current control scheme to generate substantially unity displacement power factor input currents at the AC input lines.

12. The inverter system of claim 9 further including a transformer having a three-phase primary coupled to three separate single-phase secondaries, the primary connected to receive the three-phase power at the AC input lines, wherein the rectifier comprises a single-phase bridge rectifier connected to each secondary to provide the rectified power therefrom across one of the DC bus capacitors.

13. The inverter system of claim 9 further including plural three-phase transformers, each having primaries connected to receive AC power at the AC input lines and each having three-phase secondaries, and a three-phase rectifier connected to the secondary of each transformer and connected to provide a DC voltage across one of the DC bus capacitors.

14. A method of balancing the voltages on the DC bus capacitors connected to a multilevel inverter that provides multilevel three-phase power on output lines, wherein at least three DC bus capacitors are connected in series at nodes between the capacitors with the three series capacitors connected across high and low DC bus lines, the inverter connected to the high and low DC bus lines and to intermediate bus lines connected to the nodes between the capacitors to be supplied with the voltages therefrom and wherein the inverter is comprised of a plurality of controlled switching devices and diodes connected in a configuration having redundant switching states to provide three phase power on three output lines and at at least four voltage levels on each output line, comprising the steps of:

(a) monitoring signals indicative of the voltages across the DC bus capacitors and the load currents on the output lines; and (b) switching the switching devices of the inverter to provide a desired output voltage waveform at the inverter output lines utilizing redundant switching states when such states are available on each voltage transition by using the signals indicative of the voltages and currents to select one of the available redundant switching states that serves to provide the desired phase-to-phase voltages and to tend to equalize the voltages across the DC bus capacitors, wherein there are at least two outer DC bus capacitors and an inner DC bus capacitor, and wherein at modulation depths at which sufficient redundant states are not available to effectively equalize all of the capacitor voltages, the switching devices are switched utilizing one of the available redundant states that transfers charge from the outer capacitors to the inner capacitor.

15. A multilevel inverter system comprising:

(a) three DC bus capacitors connected in series at nodes between the capacitors and with the series connected capacitors connected across high and low DC bus lines;

(b) an inverter connected to the high and low DC bus lines and to DC bus lines connected to the nodes between the capacitors to be supplied with the voltages therefrom, the inverter comprised of a plurality of controlled switching devices connected in a configuration having redundant switching states to provide three-phase power on three output load lines and at four voltage levels on each output line; and (c) control means receiving signals indicative of the voltages across the DC bus capacitors and load currents on the output lines and connected to the switching devices of the inverter to control the switching of the same, the control means using the signals indicative of the voltages and currents at each switching event for controlling the switching of the switching devices to provide a selected output voltage waveform at the output lines utilizing redundant switching states when such states are available to select one of the available redundant switching states that serves to provide the desired phase-to-phase voltages and to tend to equalize the voltages across the DC bus capacitors, wherein the control means determines which switching state to utilize of the available switching states by evaluating the quantity $Q = \max\ \{\Delta V_{c1} i_{c1},\ \Delta V_{c2} i_{c2},\ \Delta V_{c3} i_{c3}\}$ for each available switching state and selecting one of the available redundant switching states for which the quantity Q is $\leq 0$, wherein $\Delta V_{c1}$, $\Delta V_{c2}$, and $\Delta V_{c3}$ are the respective differences between the measured voltage across each capacitor and the nominal voltage across each capacitor, and $i_{c1}$, $i_{c2}$, and $i_{c3}$ are the currents flowing through the respective capacitors determined for the load currents and the available switching states.

16. The inverter system of claim 15 wherein the control means selects the one of the available redundant switching states for which the quantity Q is most negative.

17. A multilevel inverter system comprising:

(a) at least three DC bus capacitors connected in series at nodes between the capacitors and with the series connected capacitors connected across high and low DC bus lines;

(b) an inverter connected to the high and low DC bus lines and to DC bus lines connected to the nodes between the capacitors to be supplied with the voltages therefrom, the inverter comprised of a plurality of controlled switching devices connected in a configuration having redundant switching states to provide three-phase power on three output load lines and at least four voltage levels on each output line; and (c) control means receiving signals indicative of the voltages across the DC bus capacitors and load currents on the output lines and connected to the switching devices of the inverter to control the switching of the same, the control means using the signals indicative of the voltages and currents at each switching event for controlling the switching of the switching devices to provide a selected output voltage waveform at the output lines utilizing redundant switching states when such states are available to select one of the available redundant switching states that serves to provide the desired phase-to-phase voltages and to tend to equalize the voltages across the DC bus capacitors, wherein the control means controls the inverter to switch the switching devices under sine-triangle pulse-width modulation when redundant states are available and to switch the switching devices in accordance with space vector modulation when redundant switching states are not available.

18. The inverter system of claim 17 wherein the space vector modulation is four level space vector modulation.

19. A multilevel inverter system comprising:
   (a) at least three DC bus capacitors connected in series at nodes between the capacitors and with the series connected capacitors connected across high and low DC bus lines;
   (b) an inverter connected to the high and low DC bus lines and to DC bus lines connected to the nodes a between the capacitors to be supplied with the voltages therefrom, the inverter comprised of a plurality of controlled switching devices and diodes connected in a diode clamped multilevel inverter configuration to provide three-phase power on three output lines and at at least four voltage levels on each output line; and
   (c) control means connected to the switching devices of the inverter for controlling the switching of the switching devices to provide a selected output voltage waveform at the output lines, wherein the control means controls the switching devices to switch under pulse-width modulation for modulation depths $m_a$ less than a selected value and under space vector modulation for modulation depths $m_a$ greater than the selected value where $$m_a = \frac{V_{ph,pk}}{V_{DC}/2}$$

and $V_{ph,\ pk}$ is the load phase peak voltage and $V_{DC}$ is the voltage across the high and low DC bus lines.

20. The inverter system of claim 17 wherein the selected value of $m_a$ is about 0.7.

21. The inverter system of claim 19 wherein the pulse width modulation is sine-triangle pulse-width modulation and the space vector modulation is four level space vector modulation.

22. A method of balancing the voltages on the DC bus capacitors connected to a multilevel inverter that provides multilevel three-phase power on output lines, wherein at least three DC bus capacitors are connected in series at nodes between the capacitors with the three series capacitors connected across high and low DC bus lines, the inverter connected to the high and low DC bus lines and to intermediate bus lines connected to the nodes between the capacitors to be supplied with the voltages therefrom and wherein the inverter is comprised of a plurality of controlled switching devices and diodes connected in a configuration having redundant switching states to provide three phase power on three output lines and at least four voltage levels on each output line, comprising the steps of:
   (a) monitoring signals indicative of the voltages across the DC bus capacitors and the load currents on the output lines; and
   (b) switching the switching devices of the inverter to provide a desired output voltage waveform at the inverter output lines utilizing redundant switching states when such states are available on each voltage transition by using the signals indicative of the voltages and currents to select one of the available redundant switching states that serves to provide the desired phase-to-phase voltages and to tend to equalize the voltages across the DC bus capacitors, wherein the switching devices are switched under sine-triangle pulse-width modulation when redundant states are available and switched in accordance with space vector modulation when redundant switching states are not available.

23. The method of claim 22 wherein the space vector modulation is four level space vector modulation.

24. A method of controlling an n level inverter system of the type having (n-1) DC bus capacitors connected in series across high and low DC bus lines, wherein n is at least four, and an inverter connected to the high and low DC bus lines and to DC bus lines connected to the nodes between the capacitors, the inverter comprised of controlled switching devices and diodes connected in a diode-clamped multilevel inverter configuration to provide three-phase power on three output lines at n voltage levels on each output line, comprising the steps of:
   (a) monitoring signals indicative of the voltages across the DC bus capacitors and the load currents on the output lines; and
   (b) controlling the switching of the switching devices to provide a selected output voltage waveform at the output lines using redundant switching states when such states are available on each voltage transition, and determining which state to utilize by evaluating the quantity $Q=\max\{\Delta V_c, i_c, \Delta V_{c2}i_{c2}, \ldots, \Delta V_{c(n-1)}i_{c(n-1)}\}$ for each available switching state and selecting one of the available redundant switching states for which the quantity Q is $\leq 0$, wherein $\Delta V_{c1}, \Delta V_{c2}, \ldots, \Delta V_{c(n-1)}$ are the respective differences between the measured voltage across each capacitor and the nominal voltage across each capacitor, and $i_{C1}, i_{C2}, \ldots, i_{C(n-1)}$ are the currents flowing through the respective capacitors for the load currents and the available switching states.

25. The method of claim 24 wherein the one of the available switching states is selected for which Q is most negative.

26. The method of claim 24 wherein n is four.

27. A method of balancing the voltages on the DC bus capacitors connected to a multilevel inverter that provides multilevel three-phase power on output lines, wherein three DC bus capacitors are connected in series at nodes between the capacitors with the three series capacitors connected across high and low DC bus lines, the inverter connected to the high and low DC bus lines and to intermediate bus lines connected to the nodes between the capacitors to be supplied with the voltages therefrom and wherein the inverter is comprised of a plurality of controlled switching devices and diodes connected in a configuration having redundant switching states to provide three phase power on three output lines and at four voltage levels on each output line, comprising the steps of:

(a) monitoring signals indicative of the voltages across the DC bus capacitors and the load currents on the output lines; and (b) switching the switching devices of the inverter to provide a desired output voltage waveform at the inverter output lines utilizing redundant switching states when such states are available on each voltage transition by using the signals indicative of the voltages and currents to select one of the available redundant switching states that serves to provide the desired phase-to-phase voltages and to tend to equalize the voltages across the DC bus capacitors, wherein the switching state to be utilized of the available switching states is determined by evaluating the quantity $Q = \Delta V_{C1} I_1 + \Delta V_{C2} I_2 + \Delta V_{C3} I_3$ for each available switching state and selecting one of the available redundant switching states for which the quantity Q is $\geq 0$, wherein $\Delta V_{C1}$, $\Delta V_{C2}$, and $\Delta V_{C3}$ are the respective differences between the measured voltage across each capacitor and the nominal voltage across each capacitor, and $I_1$, $I_2$, and $I_3$ are currents flowing through the DC bus lines to the inverter determined for the load currents and the available switching states.

28. The method of claim 27 wherein the switching devices are switched to provide a pulse-width modulated waveform of the voltage on the phase lines.

29. The method of claim 27 wherein the inverter has the switching devices and a plurality of diodes connected in a diode clamped multilevel inverter configuration.

30. The method of claim 27 wherein the switching devices are switched under sine-triangle pulse-width modulation for modulation depths $m_a$ less than a selected value and under space vector modulation for modulation depths $m_a$ greater than the selected value, where $$m_a = \frac{V_{ph,pk}}{V_{DC}/2}$$

and $V_{ph,\,pk}$ is the load phase peak voltage and $V_{DC}$ is the voltage across the high and low DC bus lines.

31. A multilevel invert system comprising:

(a) n−1 DC bus capacitors connected in series at nodes between the capacitors and with the series connected capacitors connected across high and low DC bus lines wherein n is a selected number of output voltage levels for the inverter and is at least four;

(b) an inverter connected to the high and low DC bus lines and to DC bus lines connected to the nodes between the capacitors to be supplied with the voltages therefrom, the inverter comprised of a plurality of controlled switching devices and diodes connected in a diode clamped multilevel inverter configuration to provide three-phase power on three output lines and at n voltage levels on each output line; and (c) control means receiving signals indicative of the voltages across the DC bus capacitors and load currents on the output lines and connected to the switching devices of the inverter to control the switching of the same, the control means using the signals indicative of the voltages and currents at each switching event for controlling the switching of the switching devices to provide a selected output voltage waveform at the output lines utilizing redundant switching states when such states are available to select one of the available redundant switching states that serves to provide the desired phase-to-phase voltages and to tend to equalize the voltages across the DC bus capacitors, wherein the control means determines which switching state to utilize of the available switching states by evaluating the quantity $Q = \max\{\Delta V_{c1} i_{c1}, \Delta V_{c2} i_{c2}, \ldots, \Delta V_{c(n-1)} i_{c(n-1)}\}$ for each available switching state and selecting one of the available redundant switching states for which the quantity Q is $\leq 0$, wherein $\Delta V_{c1}, \Delta V_{c2}, \ldots, \Delta V_{c(n-1)}$ are the respective differences between the measured voltage across each capacitor and the nominal voltage across each capacitor, and $i_{c1}, i_{c2}, \ldots, i_{c(n-1)}$ are the currents flowing through the respective capacitors determined for the load currents and the available switching states.

32. The inverter system of claim 31 wherein the control means controls the switching devices to switch under sine-triangle pulse-width modulation for modulation depths ma less than a selected value and under space vector modulation for modulation depths ma greater than the selected value.

33. The inverter system of claim 31 wherein n is equal to four.

34. The inverter system of claim 31 wherein the control means selects the one of the available redundant switching states for which the quantity Q is most negative.

* * * * *

UNITED STATES PATENT AND TRADEMARK OFFICE
CERTIFICATE OF CORRECTION

PATENT NO. : 6,031,738
DATED : February 29, 2000
INVENTOR(S) : Thomas A. Lipo, et al.

It is certified that error appears in the above-identified patent and that said Letters Patent is hereby corrected as shown below:

In Column 3, line 44 of the patent, delete "equaline" and insert in its place --equalize-- as written in the application on page 6, line 2.

In column 7, line 22 of the patent, delete "$V_{C13) VCD}/3$" and insert in its place --$V_{C1} - V_{DC}/3$-- as written in the application on page 13, line 1.

In column 8, line 3 of the patent, delete "$I_{react}$" and insert in its place --$I_{rect}$--as written in the application on page 14, line 5.

In column 8, line 4 of the patent, delete "$I_{react}$" and insert in its place --$I_{rect}$--as written in the application on page 14, line 6.

In column 8, line 5 of the patent, delete "$I_{react}$" and insert in its place --$I_{rect}$--as written in the application on page 14, line 7.

In column 9, Equation (3) of the patent, delete "$V_{qds}$" and insert in its place --$\overline{V}_{qds}$-- as written in the application on p. 16, Equation (3).

UNITED STATES PATENT AND TRADEMARK OFFICE
CERTIFICATE OF CORRECTION

PATENT NO. : 6,031,738
DATED : February 29, 2000
INVENTOR(S) : Thomas A. Lipo, et al.

It is certified that error appears in the above-identified patent and that said Letters Patent is hereby corrected as shown below:

In column 9, Equation (4) of the patent, delete "$\Delta V_1 I_1 + V_2 I \geq 0$" and insert in its place -- $\Delta V_1 I_1 + V_2 I_2 \geq 0$ -- as written in the application on p. 16, Equation (4).

In column 14, line 28 of the patent, delete "$t_2 1$" and insert in its place -- $t_2,$ -- as written in the application on page 26, line 3.

In column 15, Equation (21) of the patent, delete "$\int_0$" and insert in its place -- $\int_0^t$ -- as written in the application on page 28, Equation (21).

In column 16, line 40 of the patent, create a new paragraph after the word "possible." as written in the application on page 30, line 10.

UNITED STATES PATENT AND TRADEMARK OFFICE
CERTIFICATE OF CORRECTION

PATENT NO. : 6,031,738
DATED : February 29, 2000
INVENTOR(S) : Thomas A. Lipo, et al.

It is certified that error appears in the above-identified patent and that said Letters Patent is hereby corrected as shown below:

In column 21, line 28 of the patent, delete the word "a" before the word "between" as written in the application on page 42, line 3 of claim 37.

In column 21, line 51 of the patent, delete "claim 17" and insert in its place --claim 19-- as written in the application on page 38, line 1 of claim 38.

In column 24, line 36 of the patent, delete "ma" and insert in its place --$m_a$-- as written in the application on page 41, line 4 of claim 32.

In column 24, line 38 of the patent, delete "ma" and insert in its place --$m_a$-- as written in the application on page 41, line 5 of claim 32.

Signed and Sealed this

Fifteenth Day of May, 2001

Attest:

NICHOLAS P. GODICI

*Attesting Officer*  *Acting Director of the United States Patent and Trademark Office*